(12) United States Patent
Hyde et al.

(10) Patent No.: US 12,551,009 B2
(45) Date of Patent: Feb. 17, 2026

(54) PORTABLE STANDS FOR PORTABLE GRILLS

(71) Applicant: Weber-Stephen Products LLC, Palatine, IL (US)

(72) Inventors: Christian D. Hyde, Chicago, IL (US); Curtis P. Menning, Palatine, IL (US); Nicholas M. Nanos, Jr., Crystal Lake, IL (US); William A. Mecker, Kildeer, IL (US)

( * ) Notice: Subject to any disclaimer, the term of this patent is extended or adjusted under 35 U.S.C. 154(b) by 168 days.

(21) Appl. No.: 18/422,390

(22) Filed: Jan. 25, 2024

(65) Prior Publication Data
US 2025/0241440 A1    Jul. 31, 2025

(51) Int. Cl.
*A47B 37/04*    (2006.01)
*A47B 3/083*    (2006.01)
(Continued)

(52) U.S. Cl.
CPC .............. *A47B 37/04* (2013.01); *A47B 3/083* (2013.01); *A47B 13/088* (2013.01); *A47J 37/0763* (2013.01); *A47J 37/0786* (2013.01)

(58) Field of Classification Search
CPC ....... A47B 37/04; A47B 3/083; A47B 13/088; A47B 13/10; A47B 87/002; A47B 2087/004; A47B 17/065; A47B 2200/0045; A47B 25/00; A47B 1/10; A47B 13/081; A47J 37/0763; A47J 37/0786
USPC ... 108/50.13, 12, 13, 14, 65, 66, 69, 78, 83, 108/84, 86, 143, 93, 94, 62, 63, 25, 108/50.11, 90, 87, 97, 98; 99/385, 450, 99/449; 126/25 R
See application file for complete search history.

(56) References Cited

U.S. PATENT DOCUMENTS

| 701,782   | A | * | 6/1902 | White |           |
|-----------|---|---|--------|-------|-----------|
| 5,140,973 | A | * | 8/1992 | Home  | A47J 37/0786 |
|           |   |   |        |       | 126/41 R  |

(Continued)

FOREIGN PATENT DOCUMENTS

| CA | 3056535 C     |   | 11/2021 |
|----|---------------|---|---------|
| CN | 209846957 U   | * | 12/2019 |

(Continued)

OTHER PUBLICATIONS

KR970005321 English translation (Year: 1997).*

(Continued)

*Primary Examiner* — Janet M Wilkens
(74) *Attorney, Agent, or Firm* — Avantech Law, LLP

(57) ABSTRACT

Portable stands for portable grills are disclosed. An example portable stand includes a frame and first and second tabletops. The frame includes a front support, a rear support spaced apart from the front support, and a support plate located between the front support and the rear support. The support plate has a first lateral portion and a second lateral portion. The first and second tabletops are slidable relative to the frame between an expanded position and a retracted position. The first and second tabletops are configured to reveal corresponding ones of the first and second lateral portions of the support plate when the first and second tabletops are in the expanded position, and to conceal the corresponding ones of the first and second lateral portions of the support plate when the first and second tabletops are in the retracted position.

21 Claims, 33 Drawing Sheets

(51) Int. Cl.
*A47B 13/08* (2006.01)
*A47J 37/07* (2006.01)

(56) References Cited

U.S. PATENT DOCUMENTS

| | | | |
|---|---|---|---|
| 5,806,437 A * | 9/1998 | Huang | A47B 1/02 |
| | | | 108/86 |
| 5,934,183 A * | 8/1999 | Schlosser | A47J 37/0713 |
| | | | 126/25 R |
| 6,308,616 B1 * | 10/2001 | Johnson | A47J 37/0786 |
| | | | 126/41 R |
| 9,445,690 B2 | 9/2016 | Handyside | |
| 9,504,352 B2 | 11/2016 | Lin | |
| 9,615,654 B2 | 4/2017 | Grace | |
| 9,814,354 B2 | 11/2017 | McAdams et al. | |
| 10,299,625 B2 | 5/2019 | Cabrera | |
| 10,426,295 B2 | 10/2019 | McAdams et al. | |
| 10,729,283 B2 | 8/2020 | McAdams et al. | |
| 11,071,409 B2 | 7/2021 | Collins et al. | |
| 11,305,208 B2 | 4/2022 | Smith | |
| 11,523,708 B2 | 12/2022 | Cho | |
| 2004/0094074 A1 * | 5/2004 | Chung | A47B 1/10 |
| | | | 108/90 |
| 2006/0272630 A1 * | 12/2006 | Sanders | A47J 33/00 |
| | | | 126/9 R |
| 2020/0037756 A1 * | 2/2020 | Lord | A47B 13/081 |
| 2020/0345178 A1 | 11/2020 | Yasseen | |
| 2021/0113017 A1 | 4/2021 | Jang | |
| 2022/0000311 A1 | 1/2022 | Ebersold et al. | |
| 2022/0160166 A1 | 5/2022 | Zhang | |
| 2023/0013573 A1 | 1/2023 | McFadden et al. | |
| 2023/0301438 A1 | 9/2023 | Sherer et al. | |
| 2023/0349558 A1 | 11/2023 | Zacharczuk | |
| 2025/0017366 A1 * | 1/2025 | Feng | A47J 37/0786 |
| 2025/0082132 A1 * | 3/2025 | Bush, III | A47J 37/0713 |

FOREIGN PATENT DOCUMENTS

| | | | | |
|---|---|---|---|---|
| CN | 111493510 A | | 8/2020 | |
| CN | 217089903 U | | 8/2022 | |
| DE | 112006000566 B4 | | 4/2009 | |
| DE | 202018106159 U1 | | 1/2019 | |
| DE | 202024101955 U1 * | | 5/2024 | A47B 3/083 |
| EP | 3207824 A1 | | 8/2017 | |
| EP | 3558057 B1 | | 4/2023 | |
| FR | 3099038 A1 | | 1/2021 | |
| KR | 970005321 B1 * | | 4/1997 | |
| KR | 101360884 B1 | | 2/2014 | |
| KR | 20250060330 A * | | 5/2025 | A47B 13/081 |

OTHER PUBLICATIONS

International Searching Authority, "International Search Report and Written Opinion," issued in connection with International Patent Application No. PCT/US2024/058072, mailed on Mar. 25, 2025, 10 pages.

\* cited by examiner

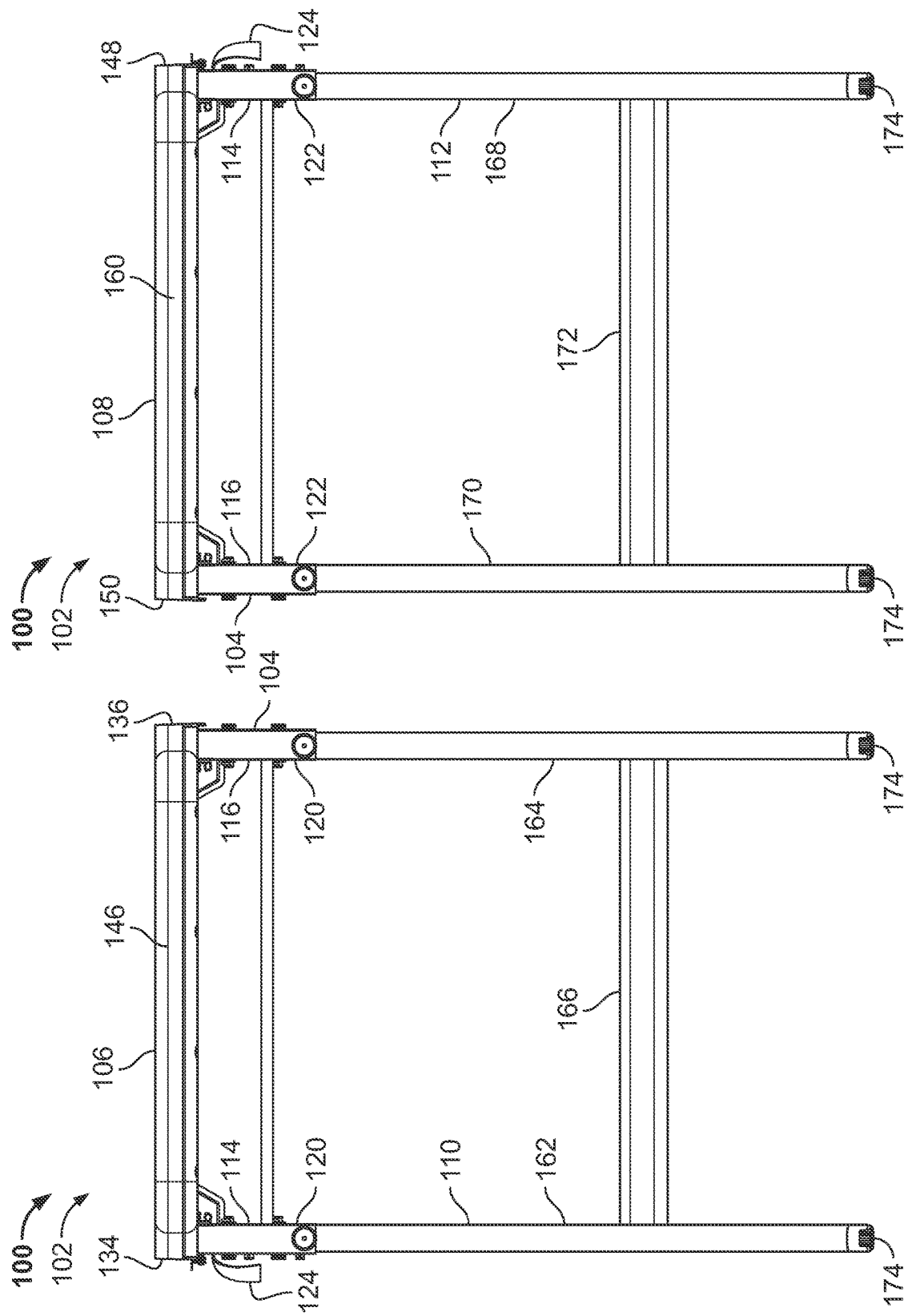

SECTION A-A

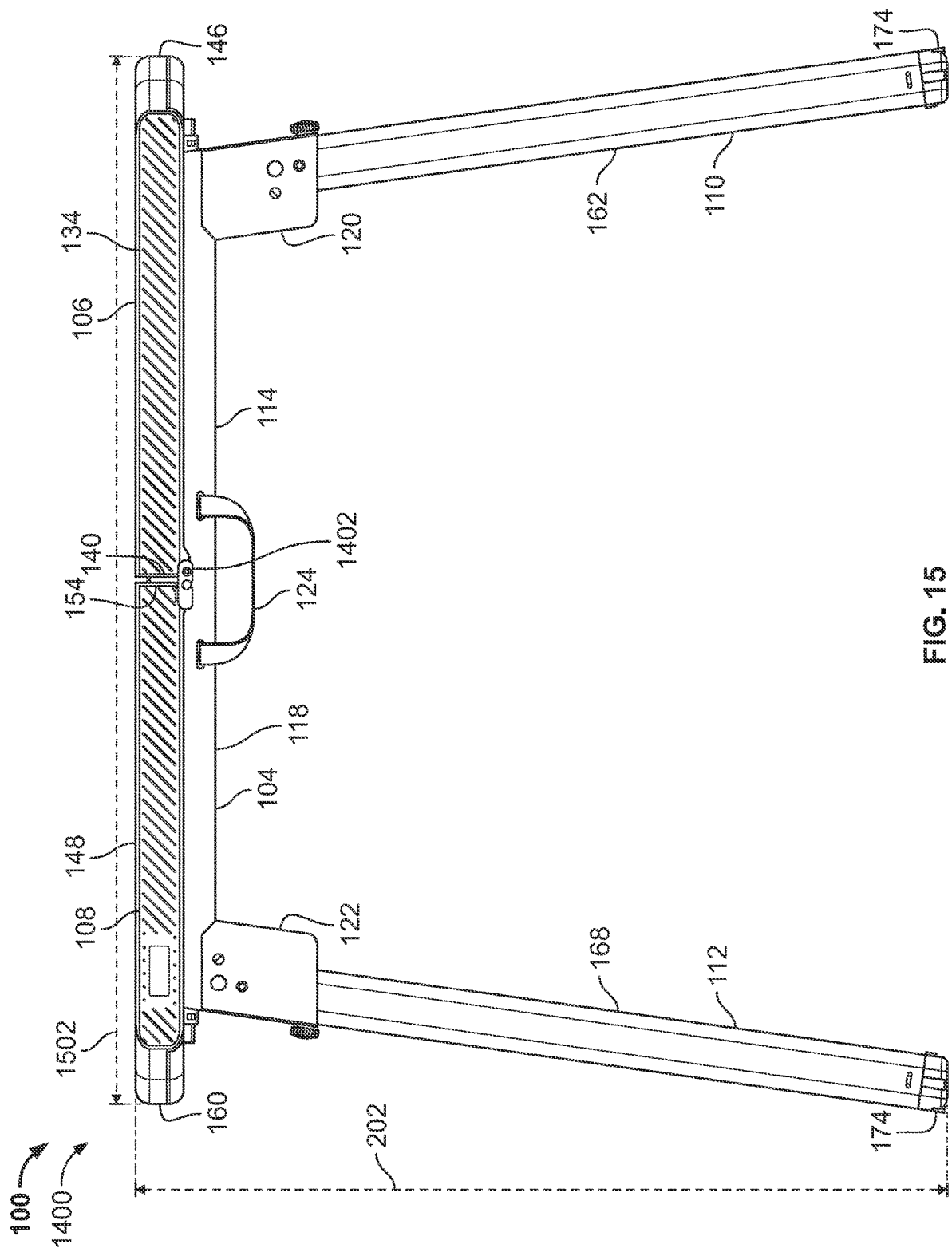

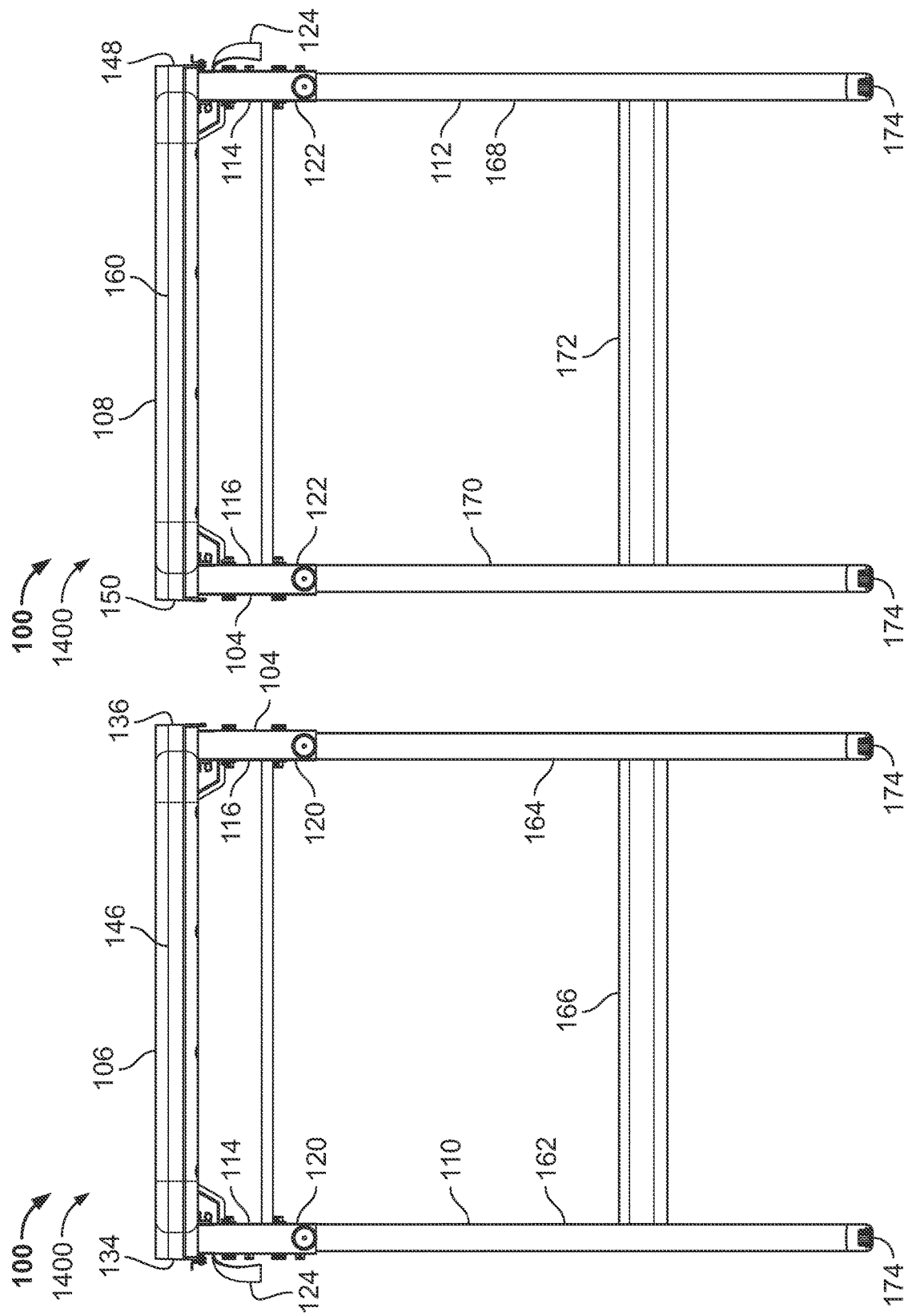

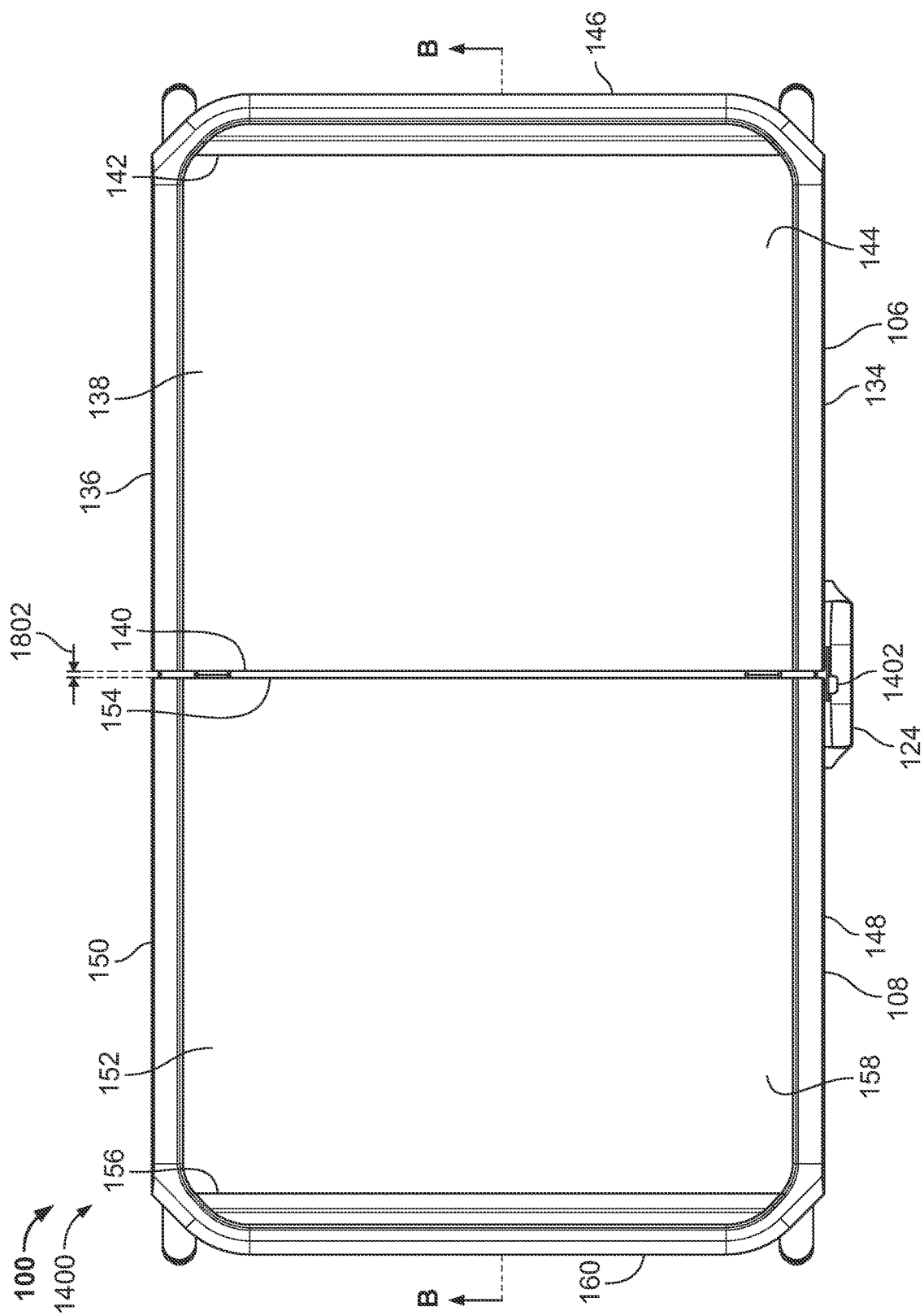

SECTION B-B

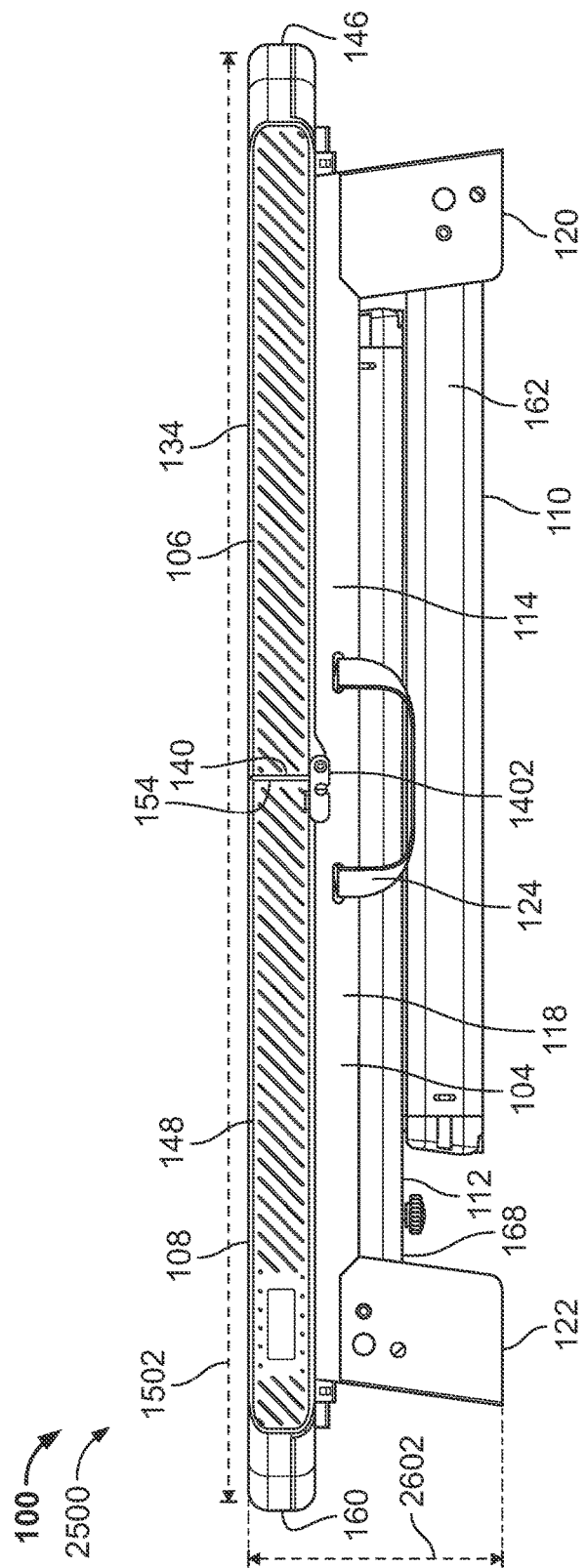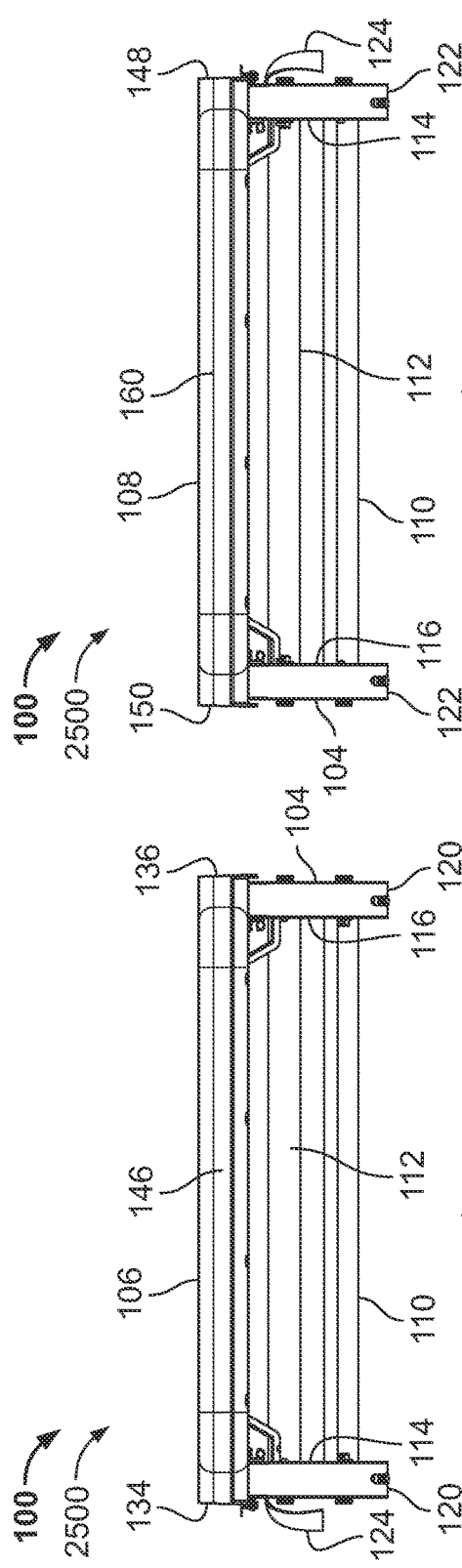

SECTION C-C

SECTION D-D

PORTABLE STANDS FOR PORTABLE GRILLS

FIELD OF THE DISCLOSURE

This disclosure relates generally to stands for grills and, more specifically, to portable stands for portable grills.

BACKGROUND

Portable grills (e.g., portable gas grills, portable electric grills, portable charcoal grills, etc.) are typically compact, lightweight, and easy to transport, thereby providing users with the flexibility to enjoy outdoor cooking in a variety of environments (e.g., in a backyard, on a patio or balcony, at a tailgating site, at a picnic site, at a camp site, etc.) without the need for a permanent outdoor cooking setup. Portable grills come in many sizes, shapes, and configurations. Some portable grills are configured to be removably placed (e.g., seated) on a tabletop or a stand when the portable grill is in use. In some instances, the tabletop or stand is itself portable. For example, a stand may include foldable, retractable, and/or collapsible legs that enable the stand to be transitioned between an erected configuration (e.g., a use configuration) and a collapsed configuration (e.g., a storage or transport configuration). In some instances, the stand is mechanically coupled to (e.g., integrally formed with) a frame of the portable grill such that the portable grill and the stand move and/or travel together as a single integrated unit.

BRIEF DESCRIPTION OF THE DRAWINGS

FIG. 3 is a right side view of the portable stand of FIGS. 1 and 2, with the portable stand shown positioned in the first configuration of FIGS. 1 and 2.

FIG. 4 is a left side view of the portable stand of FIGS. 1-3, with the portable stand shown positioned in the first configuration of FIGS. 1-3.

FIG. 15 is a front view of the portable stand of FIGS. 1-14, with the portable stand shown positioned in the second configuration of FIG. 14.

FIG. 16 is a right side view of the portable stand of FIGS. 1-15, with the portable stand shown positioned in the second configuration of FIGS. 14 and 15.

FIG. 17 is a left side view of the portable stand of FIGS. 1-16, with the portable stand shown positioned in the second configuration of FIGS. 14-16.

FIG. 18 is a top view of the portable stand of FIGS. 1-17, with the portable stand shown positioned in the second configuration of FIGS. 14-17.

FIG. 26 is a front view of the portable stand of FIGS. 1-25, with the portable stand shown positioned in the third configuration of FIG. 25.

FIG. 27 is a right side view of the portable stand of FIGS. 1-26, with the portable stand shown positioned in the third configuration of FIGS. 25 and 26.

FIG. 28 is a left side view of the portable stand of FIGS. 1-27, with the portable stand shown positioned in the third configuration of FIGS. 25-27.

Figure 1:
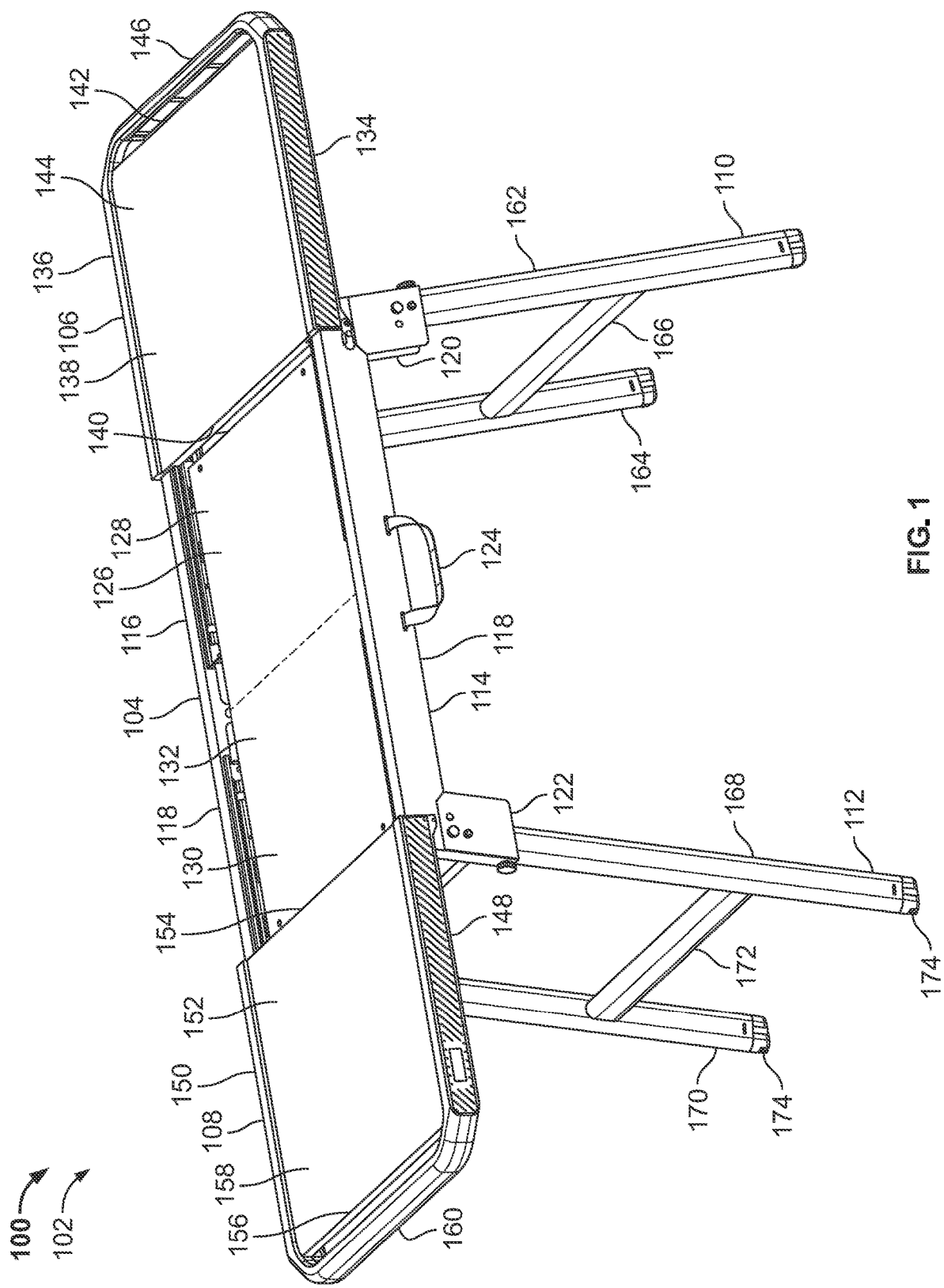
FIG. 1 is a perspective view of an example portable stand constructed in accordance with the teachings of this disclosure, with the portable stand shown positioned in an example first configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Example portable stands disclosed herein are advantageously configured to be transitioned between: (1) a first configuration in which the portable stand forms, provides, and/or functions as a support for a portable grill, and in which first and second slidable tabletops of the portable stand provide corresponding first and second side tables to the portable grill; (2) a second configuration in which the first and second slidable tabletops of the portable stand themselves form, provide, and/or function as a support for the portable grill, and in which the first and second tabletops of the portable stand alternatively form, provide, and/or function as a serving table; and (3) a third configuration in which the portable stand has a reduced form factor that facilitates transporting and/or storing the portable stand.

In some disclosed examples, a portable stand constructed in accordance with the teachings of this disclosure includes a frame and first and second tabletops. In some disclosed examples, the frame includes a front support, a rear support spaced apart from the front support, and a support plate located between the front support and the rear support. In some disclosed examples, the support plate includes a first lateral portion and a second lateral portion. In some disclosed examples, the first and second tabletops are slidable relative to the frame between an expanded position and a retracted position. In some disclosed examples, the first and second tabletops are configured to reveal corresponding ones of the first and second lateral portions of the support plate when the first and second tabletops are in the expanded position, and to conceal the corresponding ones of the first and second lateral portions of the support plate when the first and second tabletops are in the retracted position.

In some disclosed examples, the first and second tabletops are configured to provide corresponding first and second side tables relative to a portable grill when the first and second tabletops are in the expanded position and the portable grill is seated on the support plate. In some disclosed examples, the first and second tabletops are configured to provide a substantially continuous and unobstructed tabletop when the first and second tabletops are in the retracted position (e.g., when the portable grill is no longer seated on the support plate). In some disclosed examples, the portable stand further includes a latch assembly configured to couple the first tabletop to the second tabletop when the first and second tabletops are in the retracted position.

In some disclosed examples, the first tabletop is spaced apart from the second tabletop by a retracted lateral distance of one (1.0) inch or less when the first and second tabletops are in the retracted position, and the first tabletop is spaced apart from the second tabletop by an expanded lateral distance of twelve (12.0) inches or more when the first and second tabletops are in the expanded position. In some disclosed examples, the retracted lateral distance is preferably one-half (0.5) of an inch or less or, more preferably, one-quarter (0.25) of an inch or less. In some disclosed examples, the expanded lateral distance is preferably eighteen (18.0) inches or more or, more preferably, twenty-four (24.0) inches or more.

In some disclosed examples, the frame of the portable stand further includes first and second front slider assemblies coupled to the front support of the frame, and first and second rear slider assemblies coupled to the rear support of the frame. In some disclosed examples, the first tabletop is coupled to the first front slider assembly and the first rear slider assembly, and the second tabletop is coupled to the second front slider assembly and the second rear slider assembly. In some disclosed examples, the first front slider assembly and the first rear slider assembly facilitate sliding the first tabletop relative to the frame between the expanded position and the retracted position, and the second front slider assembly and the second rear slider assembly facilitate sliding the second tabletop relative to the frame between the expanded position and the retracted position.

In some disclosed examples, the portable stand further includes first and second leg units extending between and pivotally coupled to the front and rear supports of the frame. In some disclosed examples, the first and second leg units are moveable relative to the frame between an erected position and a collapsed position. In some disclosed examples, the portable stand has a first height when the first and second leg units are in the erected position and a second height when the first and second leg units are in the collapsed position. In some disclosed examples, the second height is less than the first height. In some disclosed examples, the first and second leg units each include one or more adjustable feet configured to level the frame.

Example portable stands disclosed herein are advantageously configured to be transitioned between the first configuration, the second configuration, and the third configuration described above. When the portable stand is in the first configuration, the first and second tabletops of the portable stand are in the expanded position and the first and second leg units of the portable stand are in the erected position. When the portable stand is in the second configuration, the first and second tabletops of the portable stand are in the retracted position and the first and second leg units of the portable stand are in the erected position. When the portable stand is in the third configuration, the first and second tabletops of the portable stand are in the retracted position and the first and second leg units of the portable stand are in the collapsed position.

Example portable stands disclosed herein are also advantageously equipped with accessory rails integrally formed with the first and second tabletops of the portable stand, with each accessory rail being configured to interchangeably receive one or more removably couplable accessories. In some disclosed examples, the portable stand includes a first accessory rail coupled to the first tabletop of the portable stand, and a second accessory rail coupled to the second tabletop of the portable stand. In some disclosed examples, the first accessory rail includes a first accessory mounting segment spaced apart from and extending along an outer lateral edge of the first tabletop, and the second accessory rail includes a second accessory mounting segment spaced apart from and extending along an outer lateral edge of the second tabletop.

In some disclosed examples, the first accessory mounting segment is configured to be engaged by a connector of a first accessory to removably couple (e.g., via a snap fit) the first accessory to the first accessory rail, and the second accessory mounting segment is configured to be engaged by a connector of a second accessory to removably couple (e.g., via a snap fit) the second accessory to the second accessory rail. In some disclosed examples, a shape of a portion of the connector of the first accessory matches a shape of a portion of the connector of the second accessory, and a shape of a portion of the first accessory mounting segment matches a shape of a portion of the second accessory mounting segment, thereby facilitating interchangeable removable coupling of either of the first or second accessories to either of the first or second accessory rails. In some disclosed examples, the first and second accessories respectively include one or more of a tool hook, a caddy, a bottle holder, a roll holder, or a bag holder.

The above-identified features as well as other advantageous features of example portable stands for portable grills disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
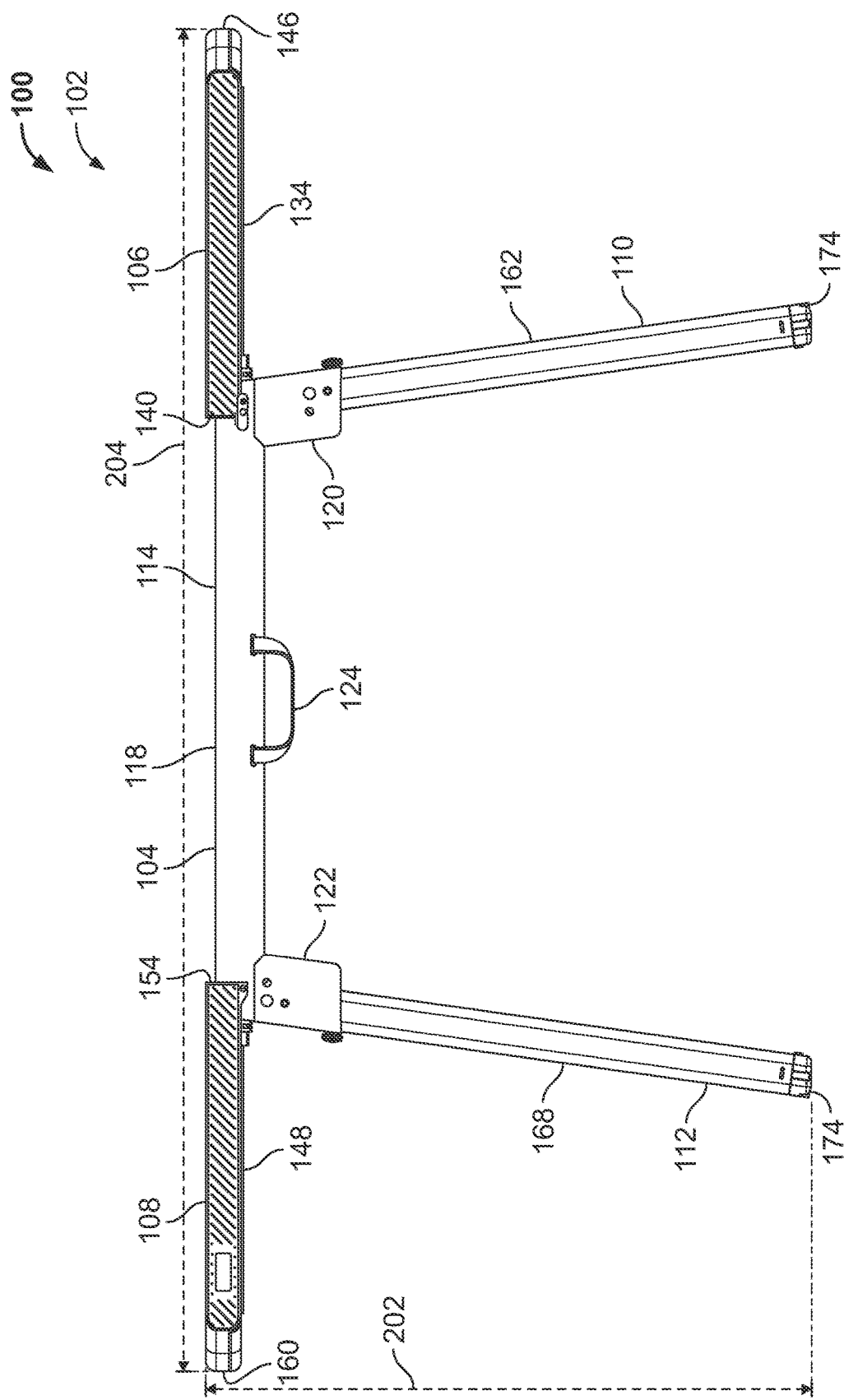
FIG. 2 is a front view of the portable stand of FIG. 1, with the portable stand shown positioned in the first configuration of FIG. 1.
Figure 5:
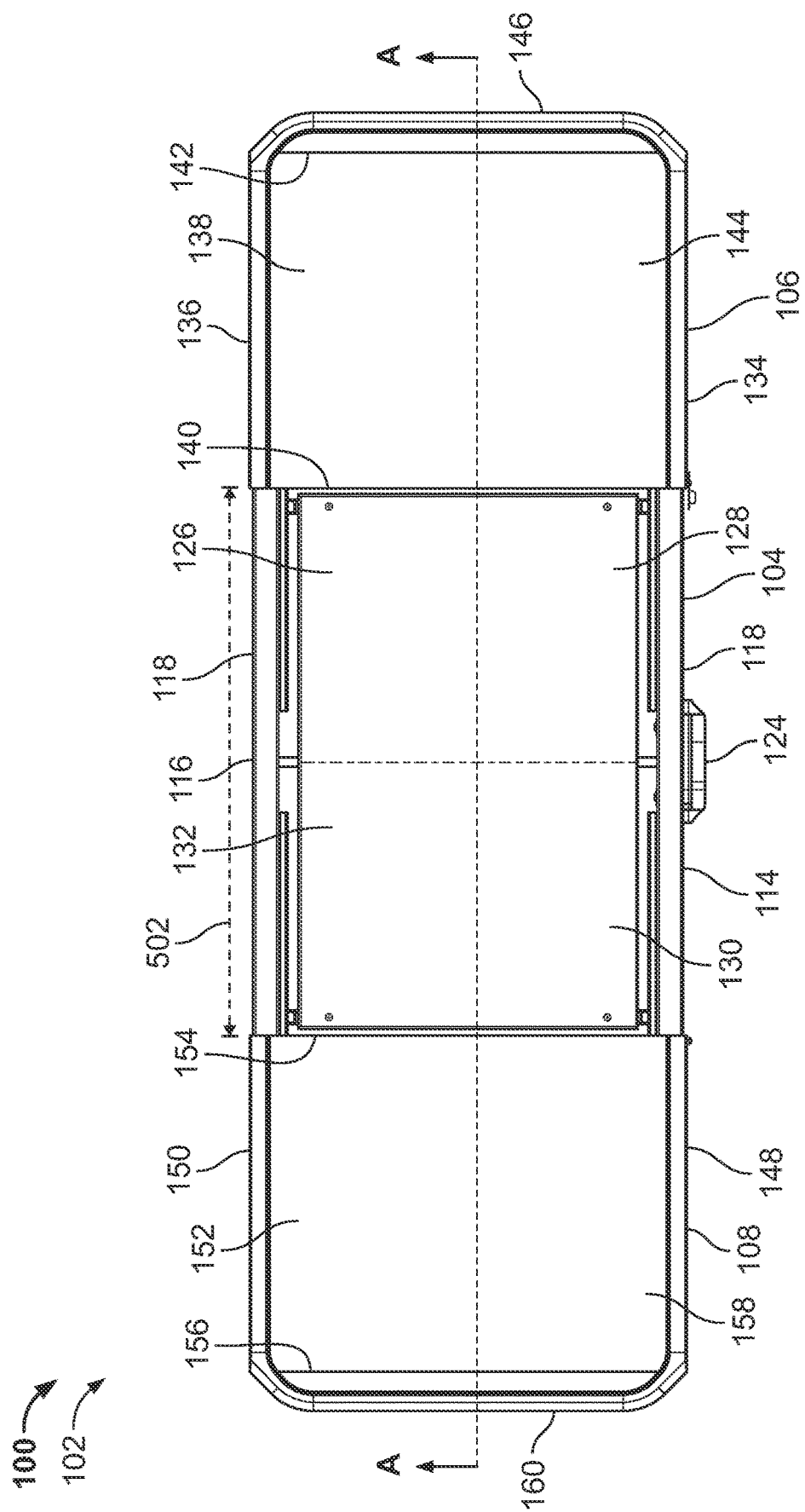
FIG. 5 is a top view of the portable stand of FIGS. 1-4, with the portable stand shown positioned in the first configuration of FIGS. 1-4.
Figure 6:
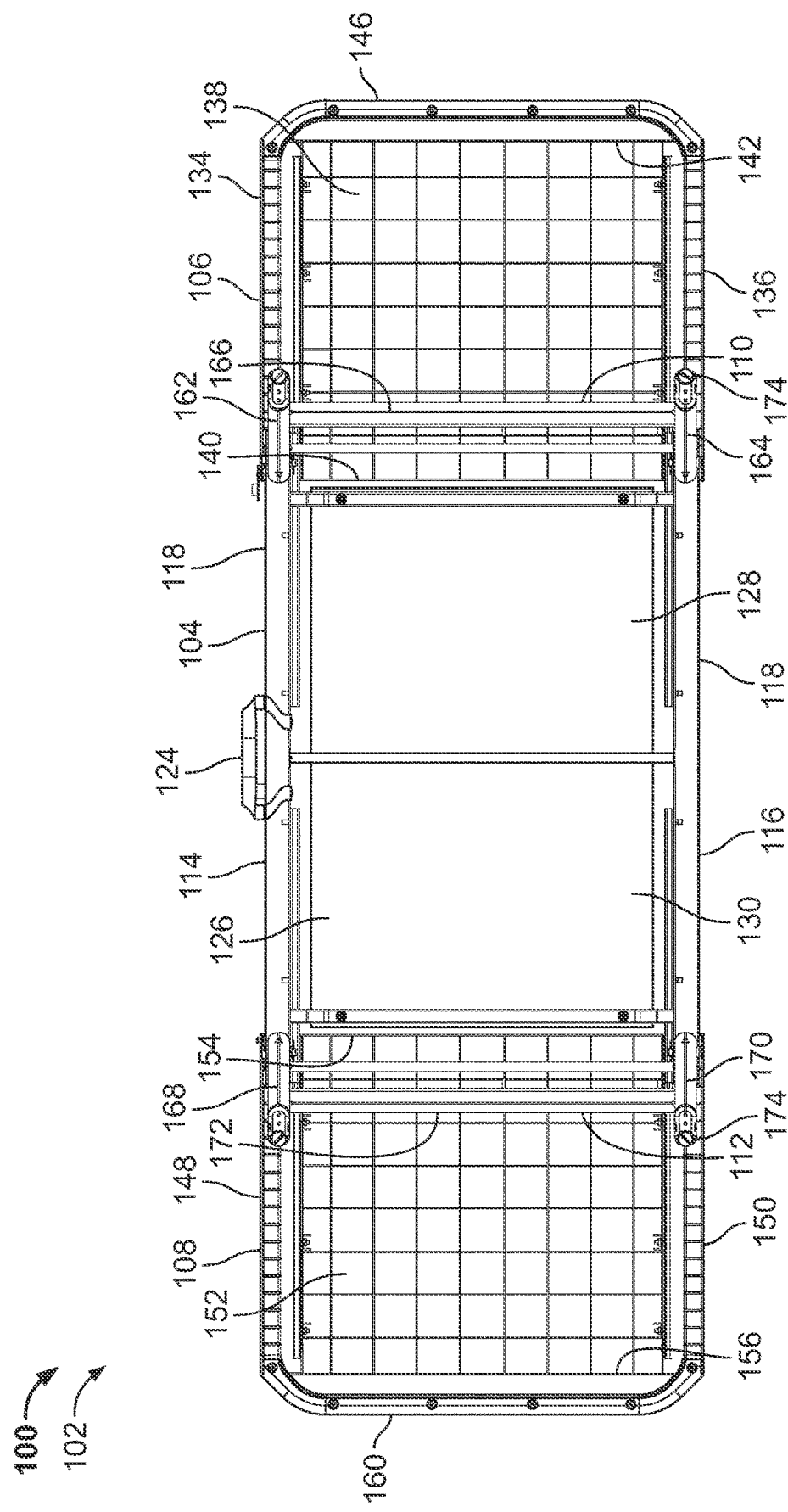
FIG. 6 is a bottom view of the portable stand of FIGS. 1-5, with the portable stand shown positioned in the first configuration of FIGS. 1-5.
Figure 7:
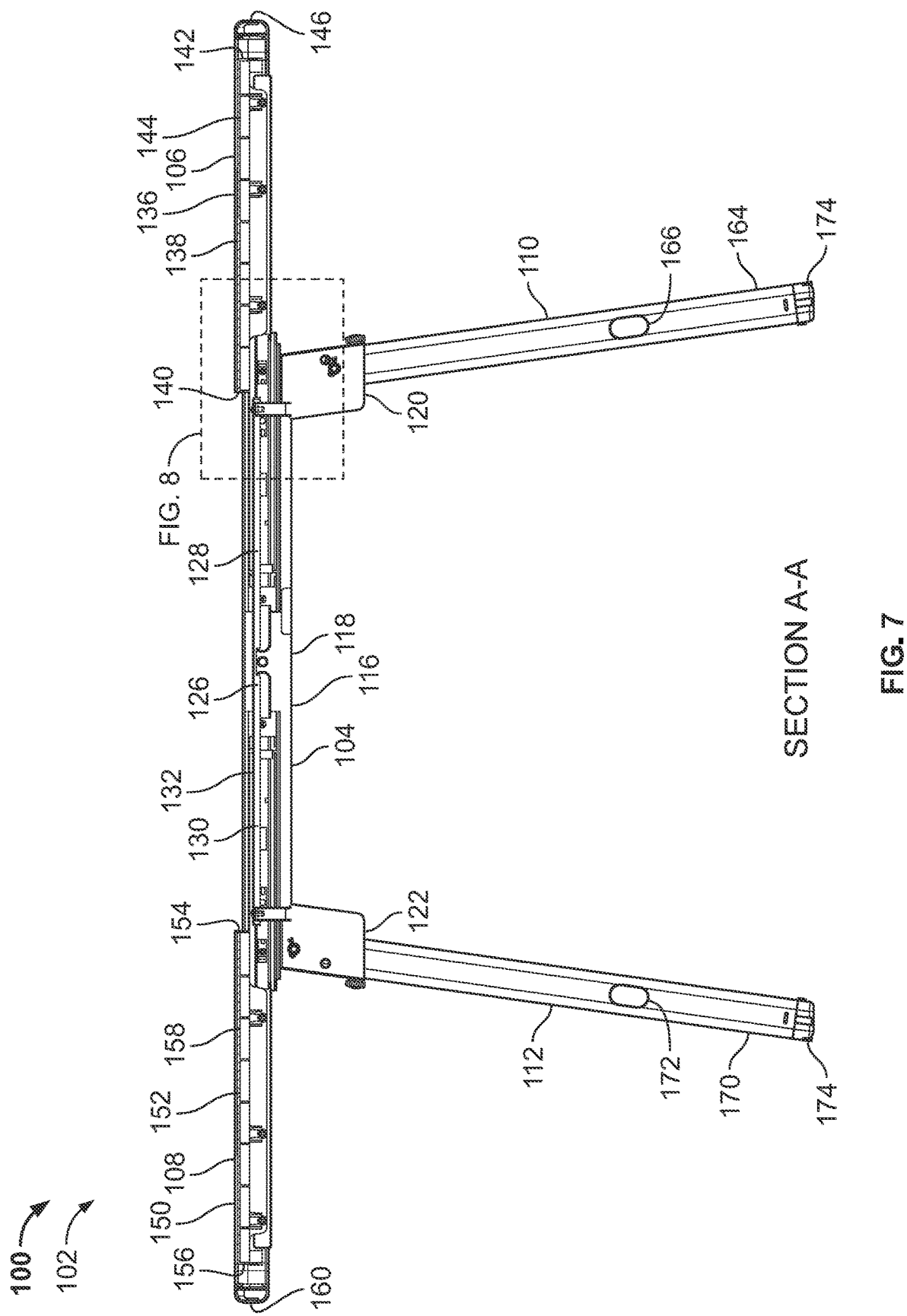
FIG. 7 is a cross-sectional view of the portable stand of FIGS. 1-6 taken along section A-A of FIG. 5, with the portable stand shown positioned in the first configuration of FIGS. 1-6.
Figure 8:
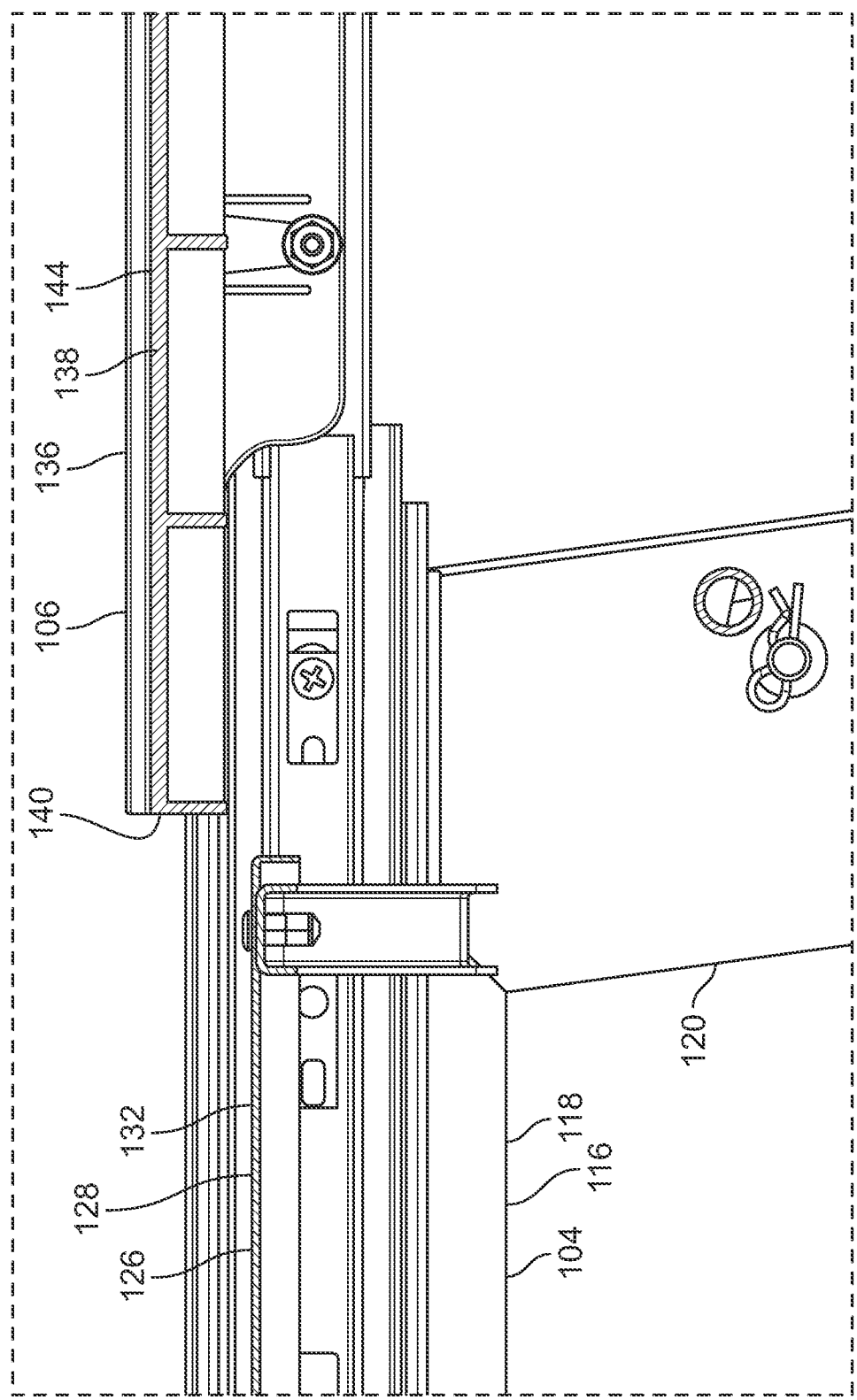
FIG. 8 is an enlarged view of a portion of FIG. 7.

FIG. 1 is a perspective view of an example portable stand 100 constructed in accordance with the teachings of this disclosure, with the portable stand 100 shown positioned in an example first configuration 102. FIG. 2 is a front view of the portable stand 100 of FIG. 1, with the portable stand shown positioned in the first configuration 102 of FIG. 1. FIG. 3 is a right side view of the portable stand 100 of FIGS. 1 and 2, with the portable stand 100 shown positioned in the first configuration 102 of FIGS. 1 and 2. FIG. 4 is a left side view of the portable stand 100 of FIGS. 1-3, with the portable stand 100 shown positioned in the first configuration 102 of FIGS. 1-3. FIG. 5 is a top view of the portable stand 100 of FIGS. 1-4, with the portable stand 100 shown positioned in the first configuration 102 of FIGS. 1-4. FIG. 6 is a bottom view of the portable stand 100 of FIGS. 1-5, with the portable stand 100 shown positioned in the first configuration 102 of FIGS. 1-5. FIG. 7 is a cross-sectional view of the portable stand 100 of FIGS. 1-6 taken along section A-A of FIG. 5, with the portable stand 100 shown positioned in the first configuration 102 of FIGS. 1-6. FIG. 8 is an enlarged view of a portion of FIG. 7.

The portable stand 100 of FIGS. 1-8 includes an example frame 104, an example first tabletop 106, an example second tabletop 108, an example first leg unit 110, and an example second leg unit 112. The first tabletop 106 and the second tabletop 108 of the portable stand 100 are slidingly coupled (e.g., via one or more slider assemblies) to the frame 104 of the portable stand 100, with the first tabletop 106 and the second tabletop 108 being slidable (e.g., along a horizontal plane) relative to the frame 104 between an expanded position (e.g., as shown in FIGS. 1-8) and a retracted position (e.g., as shown in FIGS. 14-21 described below, and/or as shown in FIGS. 25-28 described below). The first leg unit 110 and the second leg unit 112 of the portable stand 100 are pivotally coupled (e.g., via one or more pivots, axles, shafts, bolts, pins, etc.) to the frame 104 of the portable stand 100, with the first leg unit 110 and the second leg unit 112 being pivotable (e.g., rotatable) relative to the frame 104 between an erected position (e.g., as shown in FIGS. 1-8, and/or as shown in FIGS. 14-21 described below) and a collapsed position (e.g., as shown in FIGS. 25-28 described below).

When the portable stand 100 is positioned in the first configuration 102 shown in FIGS. 1-8, the first tabletop 106 and the second tabletop 108 of the portable stand 100 are in the expanded position relative to the frame 104 of the portable stand 100, and the first leg unit 110 and the second leg unit 112 of the portable stand 100 are in the erected position relative to the frame 104 of the portable stand 100. When the portable stand 100 is positioned in the first configuration 102 shown in FIGS. 1-8, the portable stand 100 has an example first width 202 and an example first height 204. In the illustrated example of FIGS. 1-8, the first width 202 of the portable stand 100 is approximately sixty-six inches (e.g., 66.1 inches), and the first height 204 of the portable stand 100 is approximately thirty inches (e.g., 29.8 inches). In other examples, the first width 202 of the portable stand 100 can instead be substantially greater than or substantially less than sixty-six inches, and the first height 204 of the portable stand 100 can instead be substantially greater than or substantially less than thirty inches.

The frame 104 of the portable stand 100 of FIGS. 1-8 includes one or more support member(s) (e.g., supports, braces, beams, bars, rods, rails, brackets, etc.) configured to support and/or carry the first tabletop 106, the second tabletop 108, the first leg unit 110, the second leg unit 112, and/or one or more other component(s) of the portable stand 100. In the illustrated example of FIGS. 1-8, the frame 104 of the portable stand 100 includes an example front support 114 and an example rear support 116 spaced apart from the front support 114. As shown in FIGS. 1-8, the front support 114 and the rear support 116 of the frame 104 have a substantially identical construction, with the rear support 116 generally being structured as a mirror image of the front support 114. In this regard, the front support 114 and the rear support 116 of the frame 104 each include an example linear segment 118, an example first leg brace 120 coupled to (e.g., integrally formed with) and extending downwardly from a first end of the linear segment 118, and an example second leg brace 122 coupled to (e.g., integrally formed with) and extending downwardly from a second end of the linear segment 118. In other examples, the front support 114 and/or the rear support 116 of the frame 104 can be sized, shaped, and/or configured in a manner that differs from that shown in FIGS. 1-8. As further shown in FIGS. 1-8, the portable stand 100 includes an example handle 124 coupled to the linear segment 118 of the front support 114 of the frame 104. The handle 124 is configured to enable a user to lift and/or carry the portable stand 100 (e.g., when the portable stand is in the third configuration shown in FIGS. 25-28).

The frame 104 of the portable stand 100 of FIGS. 1-8 further includes an example support plate 126 located between the front support 114 and the rear support 116 of the frame 104. The support plate 126 of the frame 104 includes an example first lateral portion 128 and an example second lateral portion 130. In the illustrated example of FIGS. 1-8, the first lateral portion 128 of the support plate 126 is formed by the right half of the support plate 126, and the second lateral portion 130 of the support plate 126 is formed by the left half of the support plate 126. In other examples, the first lateral portion 128 and the second lateral portion 130 of the support plate 126 can be formed by different segments of the support plate 126. For example, the first lateral portion 128 of the support plate 126 can be formed by the right third of the support plate 126, and the second lateral portion 130 of the support plate 126 can be formed by the left two-thirds of the support plate 126. As another example, the first lateral portion 128 of the support plate 126 can be formed by the right quarter of the support plate 126, and the second lateral portion 130 of the support plate 126 can be formed by the left three-quarters of the support plate 126.

The support plate 126 of the frame 104 of FIGS. 1-8 is configured to support a portable grill. In the illustrated example of FIGS. 1-8, the first lateral portion 128 and the second lateral portion 130 of the support plate 126 form a continuous surface. In other examples, the first lateral portion 128 and the second lateral portion 130 of the support plate 126 can be laterally separated from one another by a gap. In the illustrated example of FIGS. 1-8, the support plate 126 of the frame 104 includes an example upper surface 132 (e.g., defined by the first lateral portion 128 and the second lateral portion 130 of the support plate 126) having a rectangular shape. In other examples, the upper surface 132 of the support plate 126 can have a different shape (e.g., a circular shape, an oval shape, a triangular shape, a hexagonal shape, etc.). In the illustrated example of FIGS. 1-8, the upper surface 132 of the support plate 126 is planar (e.g., flat). In other examples, the upper surface 132 of the support plate 126 can be non-planar. In the illustrated example of FIGS. 1-8, the support plate 126 of the frame 104 is formed from a heat-resistant material (e.g., steel) configured to withstand heat that may be generated during use of a portable grill seated on the support plate 126 of the portable stand 100.

The first tabletop 106 of the portable stand 100 of FIGS. 1-8 includes an example front support 134, an example rear support 136, and an example support web 138. In the illustrated example of FIGS. 1-8, the front support 134 and the rear support 136 of the first tabletop 106 are spaced apart from one another, with the front support 134 of the first tabletop 106 being located proximate to (e.g., in alignment with) the front support 114 of the frame 104, and with the rear support 136 of the first tabletop 106 being located proximate to (e.g., in alignment with) the rear support 116 of the frame 104. The support web 138 of the first tabletop 106 extends between the front support 134 and the rear support 136 of the first tabletop 106. The support web 138 of the first tabletop 106 includes an example inner lateral edge 140 and an example outer lateral edge 142, each of which generally extends between the front support 134 and the rear support 136 of the first tabletop 106. The support web 138 of the first tabletop 106 of FIGS. 1-8 is configured to be of a size and shape that is suitable to cover and/or conceal the substantial entirety of the first lateral portion 128 of the support plate 126 of the frame 104 of FIGS. 1-8 when the first tabletop 106 is in the retracted position (e.g., as shown in FIGS. 14-21 described below).

The support web 138 of the first tabletop 106 of FIGS. 1-8 is also configured to support one or more item(s) that may be utilized in connection with preparing and/or serving food. For example, the support web 138 can support various quantities and/or various types of food items, as well as various quantities and/or various types of preparation, cooking, and/or serving accessories (e.g., boards, pots, pans, platters, plates, bowls, tools, utensils, etc.). In the illustrated example of FIGS. 1-8, the support web 138 of the first tabletop 106 includes an example upper surface 144. The frame 104 and the first tabletop 106 of the portable stand 100 of FIGS. 1-8 are configured such that the upper surface 132 of the support plate 126 of the frame 104 is located below the upper surface 144 of the support web 138 of the first tabletop 106. In the illustrated example of FIGS. 1-8, the upper surface 144 of the support web 138 has a rectangular shape. In other examples, the upper surface 144 of the support web 138 can have a different shape (e.g., a circular shape, an oval shape, a triangular shape, a hexagonal shape, etc.). In the illustrated example of FIGS. 1-8, the upper surface 144 of the support web 138 is planar (e.g., flat). In other examples, the upper surface 144 of the support web 138 can be non-planar.

The first tabletop 106 of the portable stand 100 of FIGS. 1-8 further includes an example accessory rail 146. In the illustrated example of FIGS. 1-8, the accessory rail 146 of the first tabletop 106 is coupled to (e.g., integrally formed with) and extends between the front support 134 and the rear support 136 of the first tabletop 106, with the accessory rail 146 being located along and spaced apart from the outer lateral edge 142 of the support web 138 of the first tabletop 106. The accessory rail 146 of the first tabletop 106 is further described below in connection with FIGS. 32-34, 36, and 41.

The second tabletop 108 of the portable stand 100 of FIGS. 1-8 includes an example front support 148, an example rear support 150, and an example support web 152. In the illustrated example of FIGS. 1-8, the front support 148 and the rear support 150 of the second tabletop 108 are spaced apart from one another, with the front support 148 of the second tabletop 108 being located proximate to (e.g., in alignment with) the front support 114 of the frame 104, and with the rear support 150 of the second tabletop 108 being located proximate to (e.g., in alignment with) the rear support 116 of the frame 104. The support web 152 of the second tabletop 108 extends between the front support 148 and the rear support 150 of the second tabletop 108. The support web 152 of the second tabletop 108 includes an example inner lateral edge 154 and an example outer lateral edge 156, each of which generally extends between the front support 148 and the rear support 150 of the second tabletop 108. The support web 152 of the second tabletop 108 of FIGS. 1-8 is configured to be of a size and shape that is suitable to cover and/or conceal the substantial entirety of the second lateral portion 130 of the support plate 126 of the frame 104 of FIGS. 1-8 when the second tabletop 108 is in the retracted position (e.g., as shown in FIGS. 14-21 described below).

The support web 152 of the second tabletop 108 of FIGS. 1-8 is also configured to support one or more item(s) that may be utilized in connection with preparing and/or serving food. For example, the support web 152 can support various quantities and/or various types of food items, as well as various quantities and/or various types of preparation, cooking, and/or serving accessories (e.g., boards, pots, pans, platters, plates, bowls, tools, utensils, etc.). In the illustrated example of FIGS. 1-8, the support web 152 of the second tabletop 108 includes an example upper surface 158. The frame 104 and the second tabletop 108 of the portable stand 100 of FIGS. 1-8 are configured such that the upper surface 132 of the support plate 126 of the frame 104 is located below the upper surface 158 of the support web 152 of the second tabletop 108. In the illustrated example of FIGS. 1-8, the upper surface 158 of the support web 150 has a rectangular shape. In other examples, the upper surface 158 of the support web 152 can have a different shape (e.g., a circular shape, an oval shape, a triangular shape, a hexagonal shape, etc.). In the illustrated example of FIGS. 1-8, the upper surface 158 of the support web 152 is planar (e.g., flat). In other examples, the upper surface 158 of the support web 152 can be non-planar.

The second tabletop 108 of the portable stand 100 of FIGS. 1-8 further includes an example accessory rail 160. In the illustrated example of FIGS. 1-8, the accessory rail 160 of the second tabletop 108 is coupled to (e.g., integrally formed with) and extends between the front support 148 and the rear support 150 of the second tabletop 108, with the accessory rail 160 being located along and spaced apart from the outer lateral edge 156 of the support web 152 of the second tabletop 108. The accessory rail 160 of the second tabletop 108 is further described below in connection with FIGS. 32-34, 36, and 41.

In the illustrated example of FIGS. 1-8, the first tabletop 106 of the portable stand 100 is spaced apart from the second tabletop 108 of the portable stand 100 by an example expanded lateral distance 502 when the first tabletop 106 and the second tabletop 108 are in the expanded position associated with the first configuration 102 shown in FIGS. 1-8. More specifically, the inner lateral edge 140 of the support web 138 of the first tabletop 106 of the portable stand 100 is spaced apart from the inner lateral edge 154 of the support web 152 of the second tabletop 108 of the portable stand 100 by the expanded lateral distance 502 when the first tabletop 106 and the second tabletop 108 are in the expanded position associated with the first configuration 102 shown in FIGS. 1-8. In some examples, the expanded lateral distance 502 is preferably twelve (12.0) inches or more. In other examples, the expanded lateral distance 502 is preferably eighteen (18.0) inches or more. In still other examples, the expanded lateral distance 502 is preferably twenty-four (24.0) inches or more.

Figure 9:
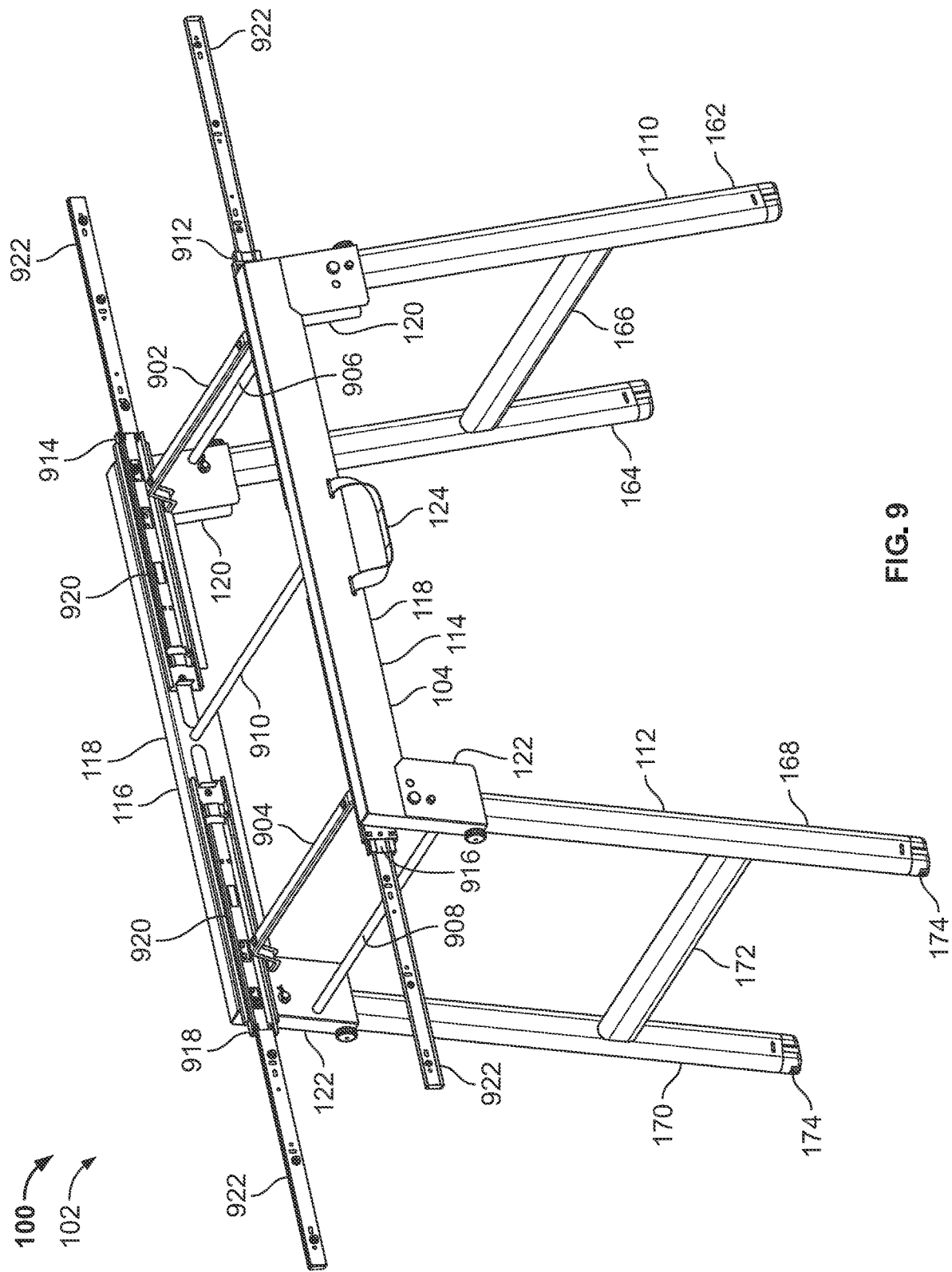
FIG. 9 is a perspective view of the portable stand of FIGS. 1-8, with the portable stand shown positioned in the first configuration FIGS. 1-8, and with the first tabletop, the second tabletop, and the support plate of the portable stand omitted.
Figure 10:
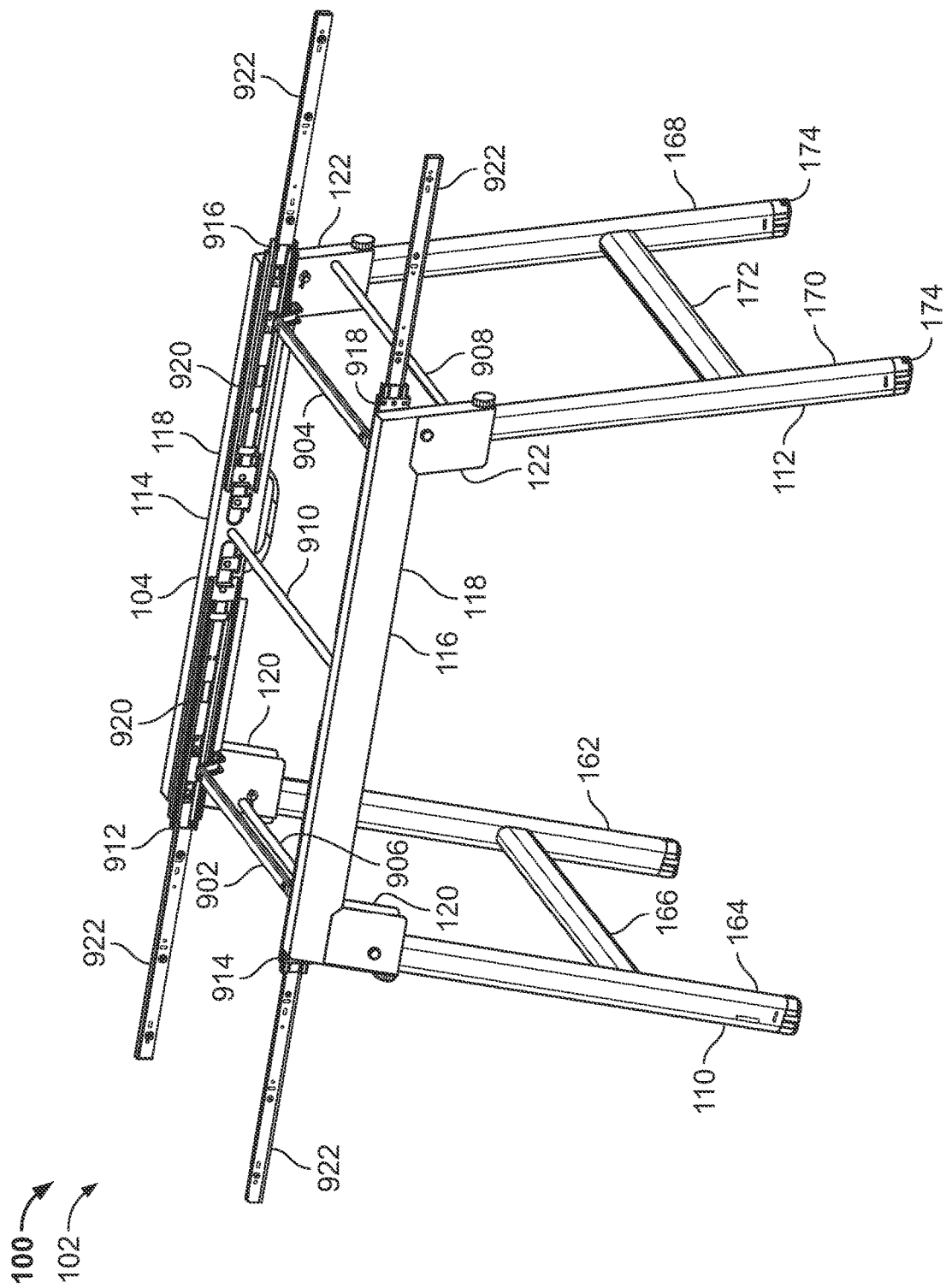
FIG. 10 is another perspective view of the portable stand of FIGS. 1-9, with the portable stand shown positioned in the first configuration FIGS. 1-9, and with the first tabletop, the second tabletop, and the support plate of the portable stand omitted.
Figure 11:
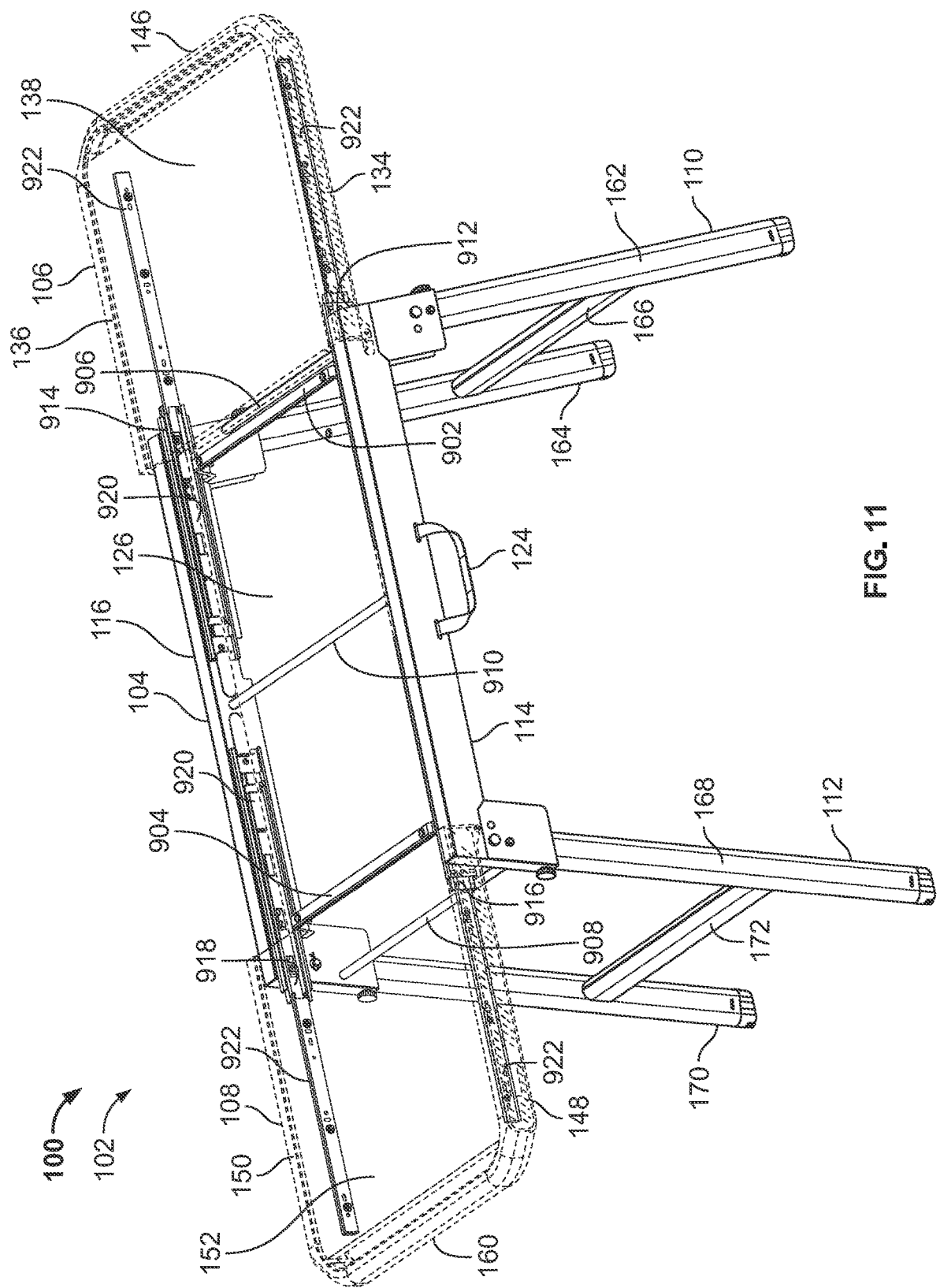
FIG. 11 is another perspective view of the portable stand of FIGS. 1-10, with the portable stand shown positioned in the first configuration FIGS. 1-10, and with the first tabletop, the second tabletop, and the support plate of the portable stand shown coupled to the frame of the portable stand and illustrated in phantom.

FIGS. 9-11 are provided to enhance the viewability of certain structural components of the above-described frame 104, including components that facilitate slidable movement of the first tabletop 106 and/or the second tabletop 108 of the portable stand 100 relative to the frame 104 of the portable stand 100. In this regard, FIG. 9 is a perspective view of the portable stand 100 of FIGS. 1-8, with the portable stand 100 shown positioned in the first configuration 102 of FIGS. 1-8, and with the first tabletop 106, the second tabletop 108, and the support plate 126 of the portable stand 100 omitted. FIG. 10 is another perspective view of the portable stand 100 of FIGS. 1-9, with the portable stand 100 shown positioned in the first configuration 102 of FIGS. 1-9, and with the first tabletop 106, the second tabletop 108, and the support plate 126 of the portable stand 100 omitted. FIG. 11 is another perspective view of the portable stand 100 of FIGS. 1-10, with the portable stand 100 shown positioned in the first configuration 102 of FIGS. 1-10, and with the first tabletop 106, the second tabletop 108, and the support plate 126 of the portable stand 100 shown coupled to the frame 104 of the portable stand 100 and illustrated in phantom.

As shown in FIGS. 9-11, the frame 104 of the portable stand 100 further includes an example first support plate brace 902 and an example second support plate brace 904, each of which extends between the front support 114 and the rear support 116 of the frame 104. For example, as shown in FIGS. 9-11, the first support plate brace 902 and the second support plate brace 904 each extend between the linear segment 118 of the front support 114 of the frame 104 and the linear segment 118 of the rear support 116 of the frame 104. In the illustrated example of FIGS. 9-11, the first support plate brace 902 and the second support plate brace 904 are laterally spaced apart from one another, with the first support plate brace 902 and the second support plate brace 904 each being configured to support a portion of the support plate 126 of the frame 104. For example, as shown in FIGS. 9-11, the first support plate brace 902 is configured to support the first lateral portion 128 of the support plate 126 of the frame 104, and the second support plate brace 904 is configured to support the second lateral portion 130 of the support plate 126 of the frame 104. In some examples, the support plate 126 of the frame 104 is coupled (e.g., via one or more fastener(s)) to the first support plate brace 902 and/or the second support plate brace 904, thereby preventing movement of the support plate 126 relative to the front support 114 and/or the rear support 116 of the frame 104.

As further shown in FIGS. 9-11, the frame 104 of the portable stand 100 also includes an example first crossbar 906, an example second crossbar 908, and an example third crossbar 910, each of which extends between the front support 114 and the rear support 116 of the frame 104. For example, as shown in FIGS. 9-11, the first crossbar 906 of the frame 104 extends between the first leg brace 120 of the front support 114 of the frame 104 and the first leg brace 120 of the rear support 116 of the frame 104. The second crossbar 908 of the frame 104 extends between the second leg brace 122 of the front support 114 of the frame 104 and the second leg brace 122 of the rear support 116 of the frame 104. The third crossbar 910 of the frame 104 extends between the linear segment 118 of the front support 114 of the frame 104 and the linear segment 118 of the rear support 116 of the frame 104. In the illustrated example of FIGS. 9-11, the third crossbar 910 of the frame 104 is laterally positioned approximately midway between the first support plate brace 902 and the second support plate brace 904 of the frame 104. The first crossbar 906, the second crossbar 908, and the third crossbar 910 are each configured to increase the overall structural integrity of the frame 104.

As further shown in FIGS. 9-11, the frame 104 of the portable stand 100 also includes a plurality of slider assemblies configured to slidingly couple the first tabletop 106 and/or the second tabletop 108 of the portable stand 100 to the frame 104 of the portable stand 100. For example, as shown in FIGS. 9-11, the frame 104 of the portable stand 100 includes an example first front slider assembly 912, an example first rear slider assembly 914, an example second front slider assembly 916, and an example second rear slider assembly 918, each of which is shown in FIGS. 9-11 in an expanded position (e.g., corresponding to the expanded position of the first tabletop 106 and/or the expanded position of the second tabletop 108). Each such slider assembly includes an example track 920 and an example slider 922 that is (e.g., slidable) relative to the track 920. For each such slider assembly, the track 920 is coupled (e.g., via one or more fastener(s)) to either the front support 114 or the rear support 116 of the frame 104, and the slider 922 is coupled (e.g., via one or more fastener(s)) to either the front support 134 or the rear support 136 of the first tabletop 106, or the front support 148 or the rear support 150 of the second tabletop 108.

For example, as shown in FIGS. 9-11, the track 920 of the first front slider assembly 912 is coupled to the front support 114 of the frame 104, and the slider 922 of the first front slider assembly 912 is coupled (e.g., as shown in FIG. 11) to the front support 134 of the first tabletop 106. The track 920 of the first rear slider assembly 914 is coupled to the rear support 116 of the frame 104, and the slider 922 of the first rear slider assembly 914 is coupled (e.g., as shown in FIG. 11) to the rear support 136 of the first tabletop 106. The track 920 of the second front slider assembly 916 is coupled to the front support 114 of the frame 104, and the slider 922 of the second front slider assembly 916 is coupled (e.g., as shown in FIG. 11) to the front support 148 of the second tabletop 108. The track 920 of the second rear slider assembly 918 is coupled to the rear support 116 of the frame 104, and the slider 922 of the second rear slider assembly 918 is coupled (e.g., as shown in FIG. 11) to the rear support 150 of the second tabletop 108. In the illustrated example of FIGS. 9-11, the first front slider assembly 912 and the first rear slider assembly 914 facilitate slidable movement (e.g., along a horizontal plane) of the first tabletop 106 relative to the support plate 126 and/or, more generally, relative to the frame 104. Similarly, the second front slider assembly 916 and the second rear slider assembly 918 facilitate slidable movement (e.g., along a horizontal plane) of the second tabletop 108 relative to the support plate 126 and/or, more generally, relative to the frame 104. In some examples, the first tabletop 106 and the second tabletop 108 are movable (e.g., slidable) independently from one another. In other examples, the first tabletop 106 can be mechanically slaved to the second tabletop 108 such that movement of the second tabletop 108 is partially or entirely dependent upon (e.g., is automatically caused by or in response to) movement of the first tabletop 106, or vice-versa.

Returning to the illustrated example of FIGS. 1-8, the first leg unit 110 of the portable stand 100 is configured to support the frame 104 of the portable stand 100 (e.g., above an underlying ground surface) when the first leg unit 110 is in the erected position (e.g., as shown in FIGS. 1-8). In the illustrated example of FIGS. 1-8, the first leg unit 110 includes an example front leg 162, an example rear leg 164, and an example crossbar 166. The front leg 162 and the rear leg 164 of the first leg unit 110 are spaced apart from one another, with the front leg 162 of the first leg unit 110 being located proximate to (e.g., in alignment with) the first leg brace 120 of the front support 114 of the frame 104, and with the rear leg 164 of the first leg unit 110 being located proximate to (e.g., in alignment with) the first leg brace 120 of the rear support 116 of the frame 104. The crossbar 166 of the first leg unit 110 extends between the front leg 162 and the rear leg 164 of the first leg unit 110.

The second leg unit 112 of the portable stand 100 is configured to support the frame 104 of the portable stand 100 (e.g., above an underlying ground surface) when the second leg unit 112 is in the erected position (e.g., as shown in FIGS. 1-8). In the illustrated example of FIGS. 1-8, the second leg unit 112 includes an example front leg 168, an example rear leg 170, and an example crossbar 172. The front leg 168 and the rear leg 170 of the second leg unit 112 are spaced apart from one another, with the front leg 168 of the second leg unit 112 being located proximate to (e.g., in alignment with) the second leg brace 122 of the front support 114 of the frame 104, and with the rear leg 170 of the second leg unit 112 being located proximate to (e.g., in alignment with) the second leg brace 122 of the rear support 116 of the frame 104. The crossbar 172 of the second leg unit 112 extends between the front leg 168 and the rear leg 170 of the second leg unit 112.

Figure 12:
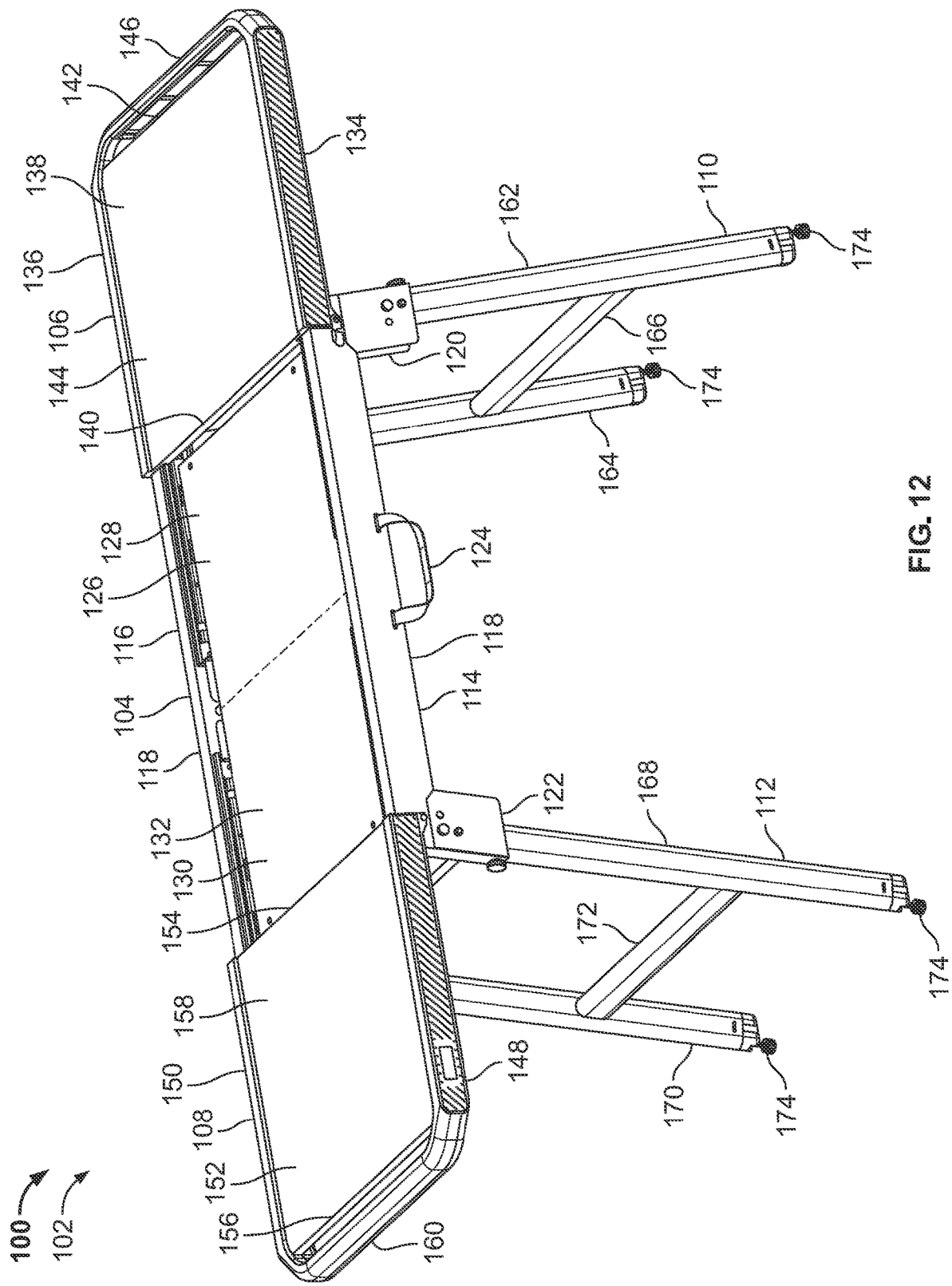
FIG. 12 is a perspective view of the portable stand of FIGS. 1-11, with the portable stand shown positioned in the first configuration of FIGS. 1-11, and with example adjustable feet of the portable stand shown in an example extended foot position.

In the illustrated example of FIGS. 1-8 each leg of the first leg unit 110 (e.g., the front leg 162 and the rear leg 164) and each leg of the second leg unit 112 (e.g., the front leg 168 and the rear leg 170) includes an example adjustable foot 174 that is configured to level the frame 104 of the portable stand 100. In this regard, the adjustable foot 174 of each leg is configured to move (e.g., to be gradually adjusted) relative to a fixed portion of the leg between a retracted foot position (e.g., as shown in FIGS. 1-8) and an extended foot position (e.g., as shown in FIG. 12). In some examples, the adjustable foot 174 includes a threaded member (e.g., a threaded shaft) that is configured to engage a complementary threaded member (e.g., a threaded bore) of a fixed portion of the leg. In such examples, rotational movement of the threaded member of the adjustable foot 174 relative to the threaded member of the fixed portion of the leg causes the adjustable foot 174 to gradually move between the retracted foot position and the extended foot position. Such rotational movement can occur in small increments that are suitable for gradually leveling the frame 104 of the portable stand 100 when the first leg unit 110 and the second leg unit 112 of the portable stand 100 are in the erected position and disposed on an underlying ground surface.

Figure 13:
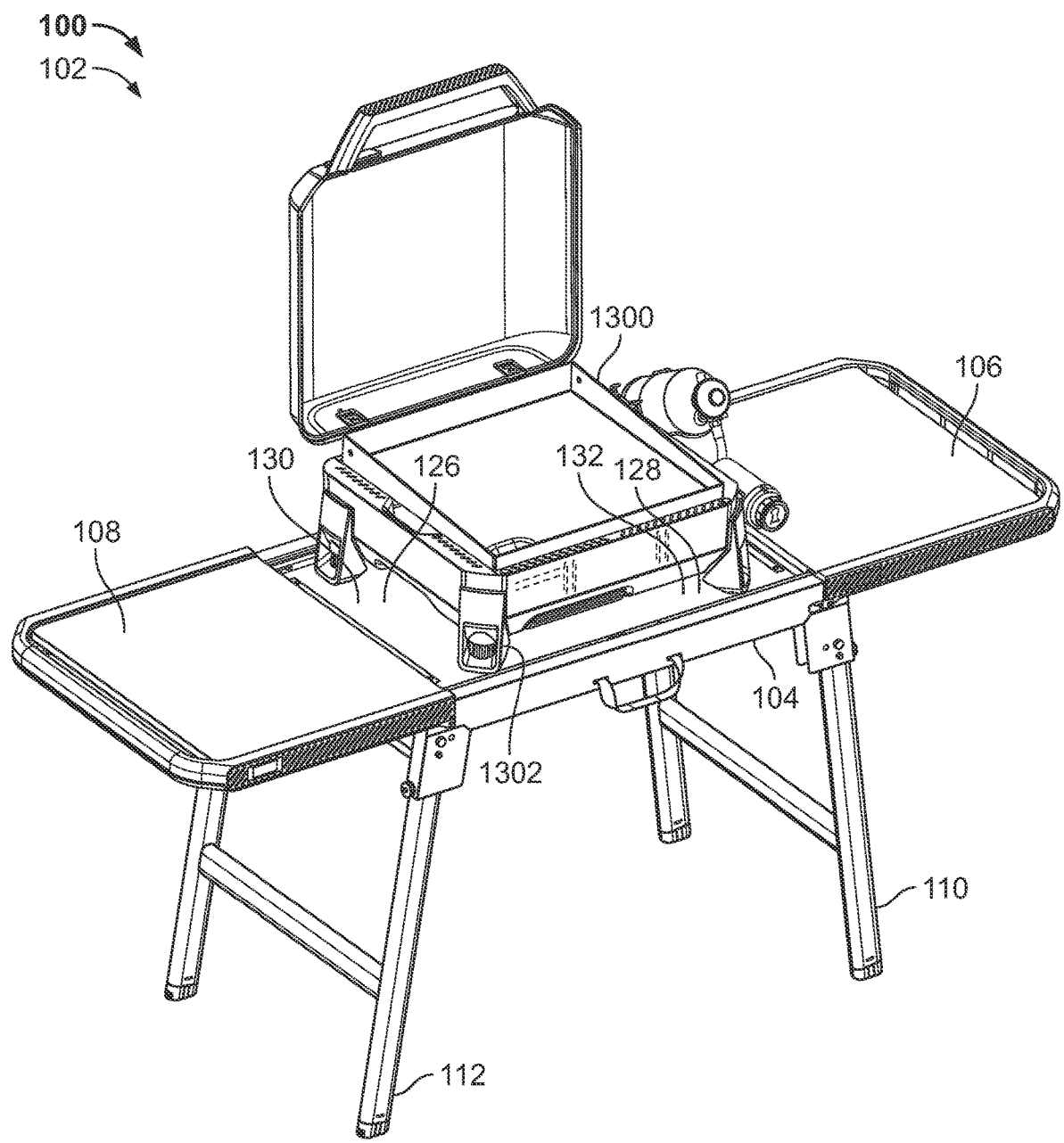
FIG. 13 is a perspective view of the portable stand of FIGS. 1-12, with the portable stand shown positioned in the first configuration of FIGS. 1-12, and with an example portable grill shown seated on the portable stand.

FIG. 13 is a perspective view of the portable stand 100 of FIGS. 1-12, with the portable stand 100 shown positioned in the first configuration 102 of FIGS. 1-12, and with an example portable grill 1300 shown seated on the portable stand 100. In the illustrated example of FIG. 13, the portable grill 1300 is a gas grill having a flattop griddle cooking surface. In other examples, the portable grill 1300 can be a different type of grill (e.g., a charcoal grill, a pellet grill, an electric grill, etc.), and/or can have a different type of cooking surface (e.g., a cooking grate, a baking stone, a rotisserie system, etc.). Positioning the first tabletop 106 and the second tabletop 108 of the portable stand 100 in the expanded position associated with the first configuration 102 of the portable stand 100 of FIGS. 1-13 reveals corresponding ones of the first lateral portion 128 and the second lateral portion 130 of the support plate 126 of the frame 104, thereby enabling the portable grill 1300 to be seated on the first lateral portion 128 and the second lateral portion 130 of the support plate 126 of the frame 104 and, more specifically, on the upper surface 132 of the support plate 126. When the portable grill 1300 is seated on the support plate 126 of the frame of the portable stand 100 (e.g., as shown in FIG. 13), the first tabletop 106 and the second tabletop 108 of the portable stand 100 provide corresponding first and second side tables (e.g., a right side table and a left side table) relative to the portable grill 1300, with the portable grill 1300 being centrally located between the first tabletop 106 and the second tabletop 108. As further shown in FIG. 13, the support plate 126 of the frame 104 of the portable stand 100 and an example base 1302 of the portable grill 1300 are configured such that the base 1302 (e.g., support legs, support feet, and/or a support surface) contacts and/or fits entirely on the upper surface 132 of the support plate 126 when the portable grill 1300 is seated on the support plate 126 of the frame 104 of the portable stand 100.

Figure 14:
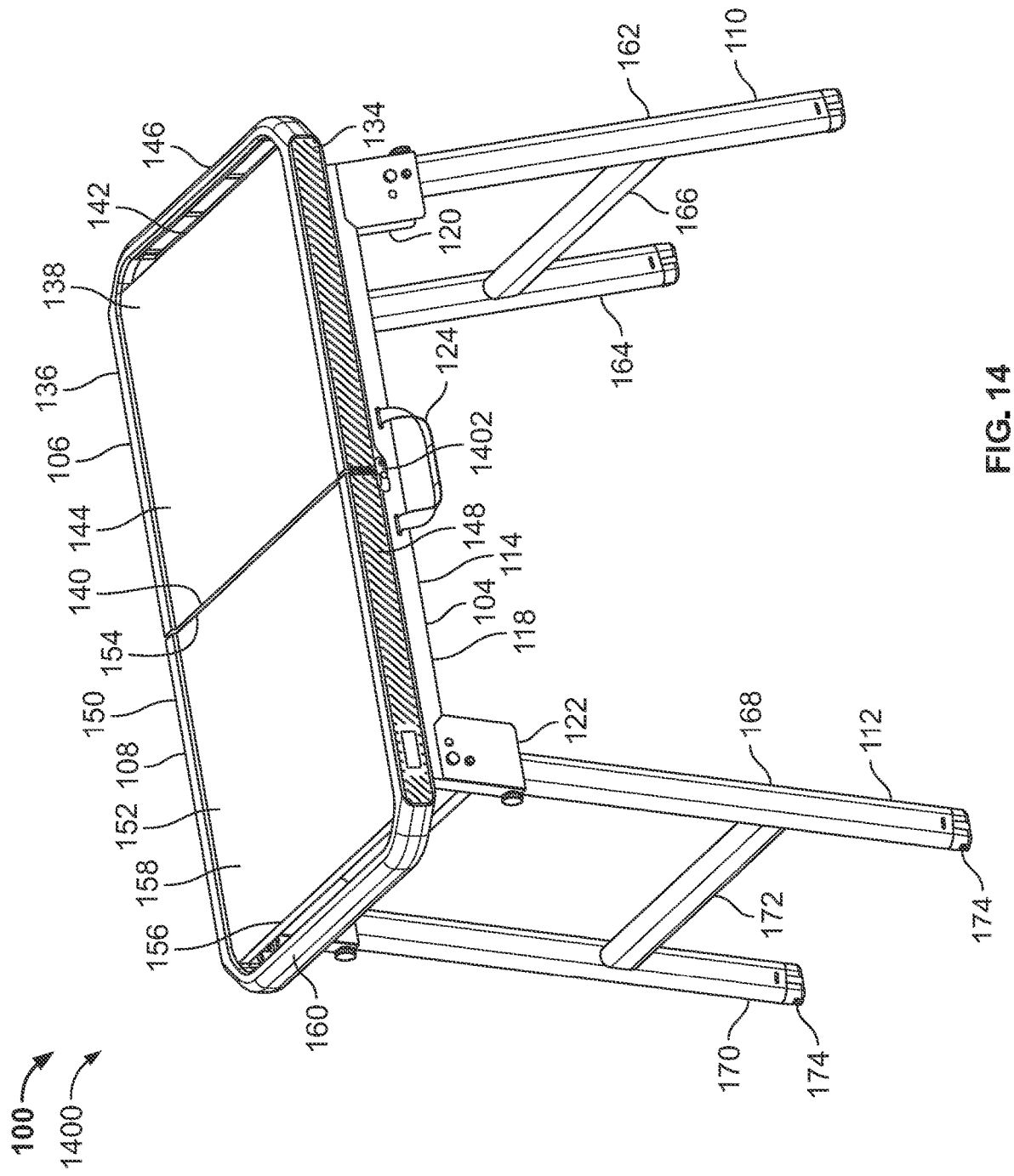
FIG. 14 is a perspective view of the portable stand of FIGS. 1-13, with the portable stand shown positioned in an example second configuration.
Figure 19:
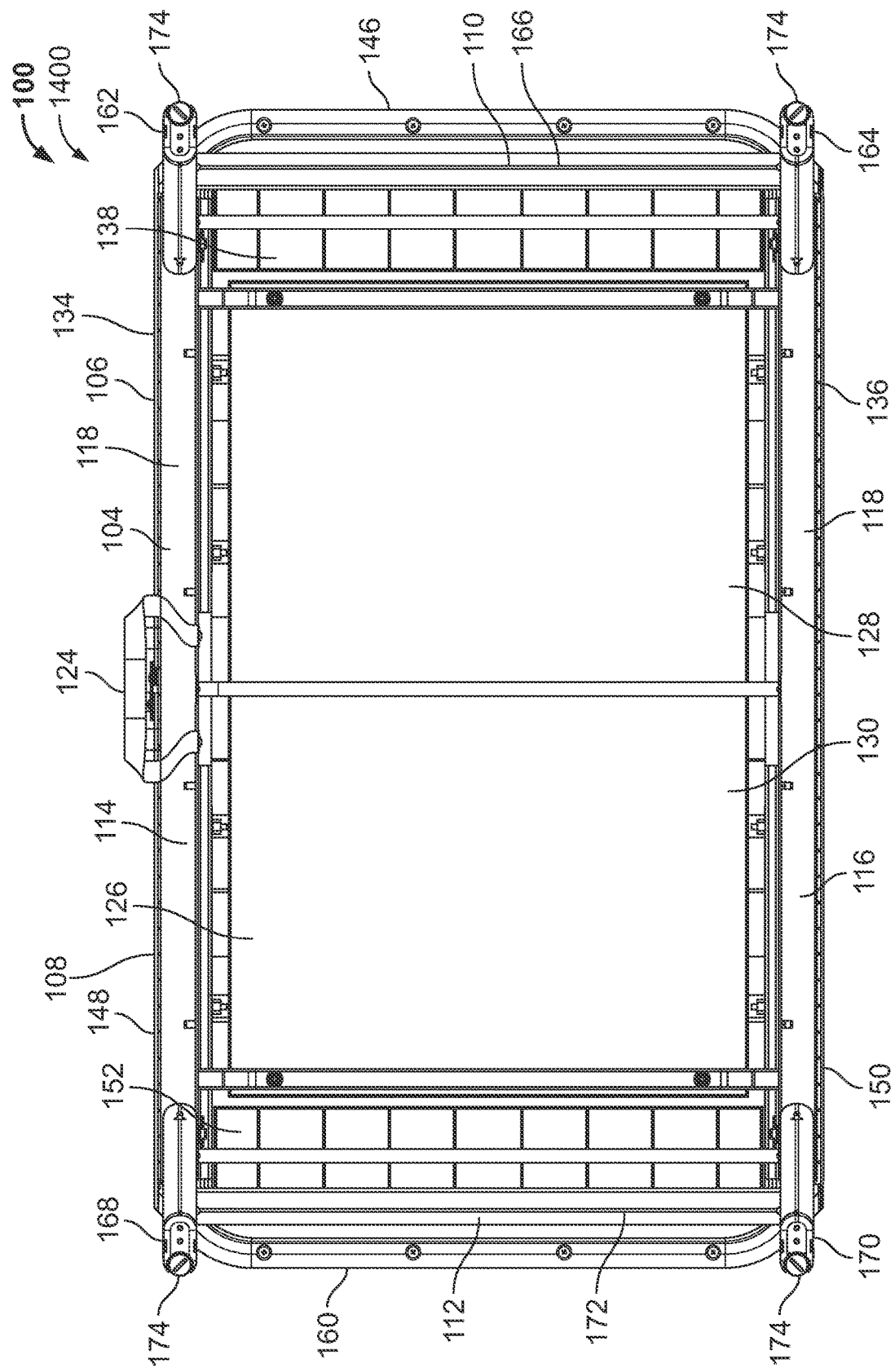
FIG. 19 is a bottom view of the portable stand of FIGS. 1-18, with the portable stand shown positioned in the second configuration of FIGS. 14-18.
Figure 20:
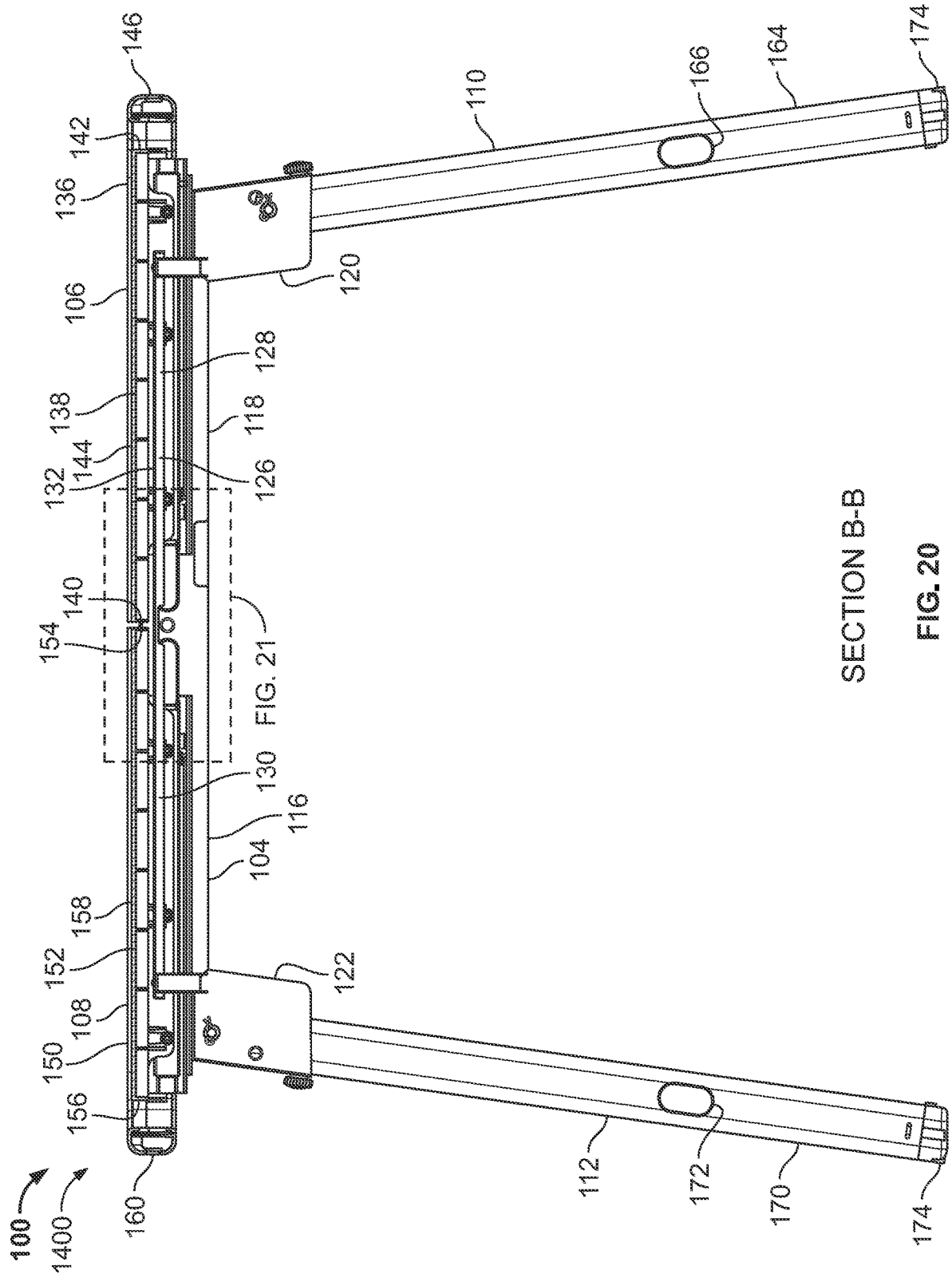
FIG. 20 is a cross-sectional view of the portable stand of FIGS. 1-19 taken along section B-B of FIG. 18.
Figure 21:
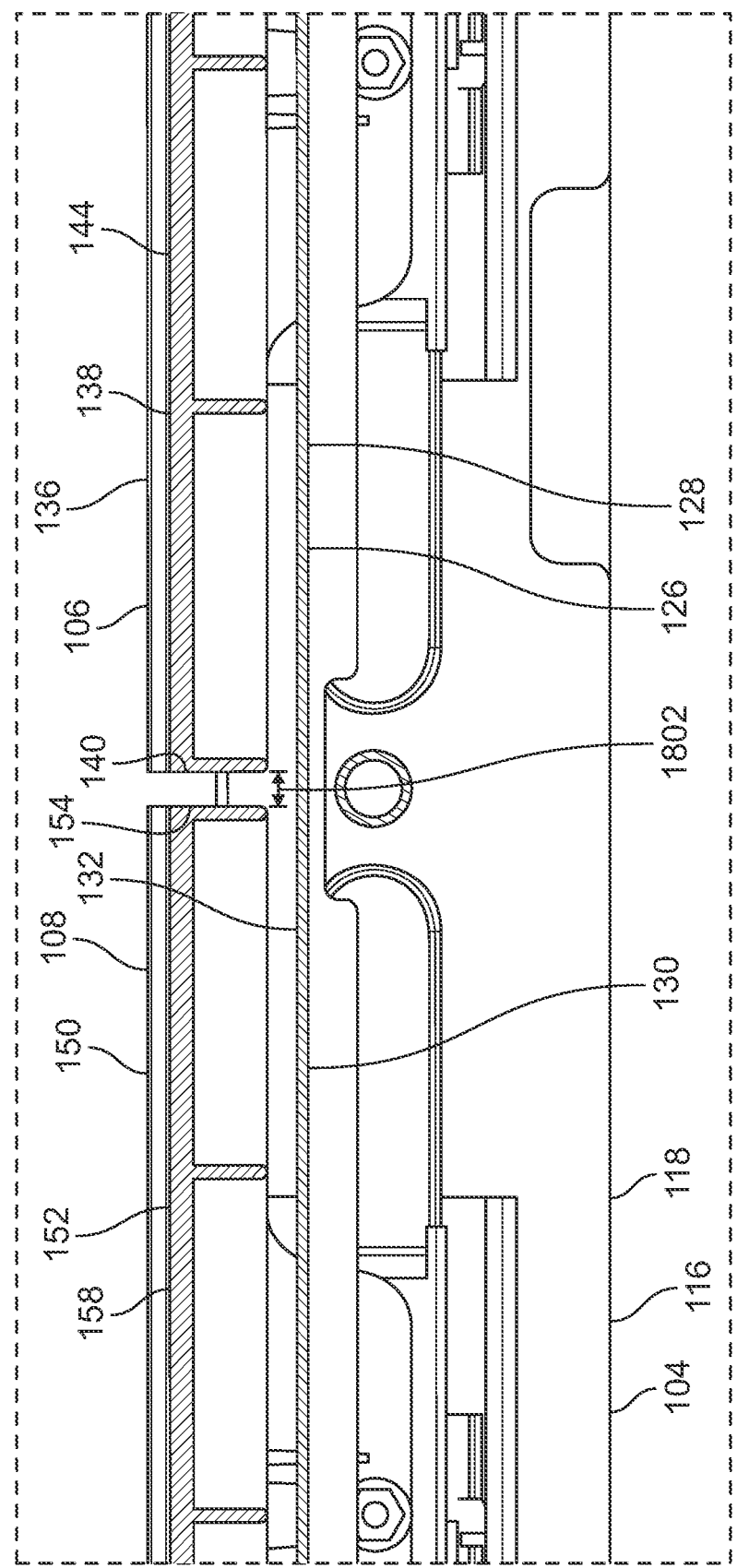
FIG. 21 is an enlarged view of a portion of FIG. 20.

FIG. 14 is a perspective view of the portable stand 100 of FIGS. 1-13, with the portable stand 100 shown positioned in an example second configuration 1400. FIG. 15 is a front view of the portable stand 100 of FIGS. 1-14, with the portable stand 100 shown positioned in the second configuration 1400 of FIG. 14. FIG. 16 is a right side view of the portable stand 100 of FIGS. 1-15, with the portable stand 100 shown positioned in the second configuration 1400 of FIGS. 14 and 15. FIG. 17 is a left side view of the portable stand 100 of FIGS. 1-16, with the portable stand 100 shown positioned in the second configuration 1400 of FIGS. 14-16. FIG. 18 is a top view of the portable stand 100 of FIGS. 1-17, with the portable stand 100 shown positioned in the second configuration 1400 of FIGS. 14-17. FIG. 19 is a bottom view of the portable stand 100 of FIGS. 1-18, with the portable stand 100 shown positioned in the second configuration 1400 of FIGS. 14-18. FIG. 20 is a cross-sectional view of the portable stand 100 of FIGS. 1-19 taken along section B-B of FIG. 18. FIG. 21 is an enlarged view of a portion of FIG. 20.

When the portable stand 100 is positioned in the second configuration 1400 shown in FIGS. 14-21, the first tabletop 106 and the second tabletop 108 of the portable stand 100 are in the retracted position relative to the frame 104 of the portable stand 100, and the first leg unit 110 and the second leg unit 112 of the portable stand 100 are in the erected position relative to the frame 104 of the portable stand 100. When the portable stand 100 is positioned in the second configuration 1400 shown in FIGS. 14-21, the portable stand 100 maintains the first height 204 associated with the first configuration 102 of FIGS. 1-8, but transitions to an example second width 1502 that is less than the first width 202 associated with the first configuration 102 of FIGS. 1-8. In the illustrated example of FIGS. 14-21, the second width 1502 of the portable stand 100 is approximately thirty-eight inches (e.g., 38.4 inches). In other examples, the second width 1502 of the portable stand 100 can instead be substantially greater than or substantially less than thirty-eight inches.

As shown in FIGS. 14-21, the first tabletop 106 and the second tabletop 108 of the portable stand 100 conceal corresponding ones of the first lateral portion 128 and the second lateral portion 130 of the support plate 126 of the frame 104 of the portable stand 100 when the first tabletop 106 and the second tabletop 108 are in the retracted position relative to the frame 104. In this regard, the support web 138 of the first tabletop 106 covers and/or conceals the substantial entirety of the first lateral portion 128 of the support plate 126 of the frame 104 when the first tabletop 106 is in the retracted position (e.g., as shown in FIGS. 14-21). Similarly, the support web 152 of the second tabletop 108 covers and/or conceals the substantial entirety of the second lateral portion 130 of the support plate 126 of the frame 104 of FIGS. 1-8 when the second tabletop 108 is in the retracted position (e.g., as shown in FIGS. 14-21). As shown in FIGS. 14-21, the upper surface 132 of the support plate 126 of the frame 104 is located below the upper surface 144 of the support web 138 of the first tabletop 106 and below the upper surface 158 of the support web 152 of the second tabletop 108 when the when the first tabletop 106 and the second tabletop 108 are in the retracted position relative to the frame 104.

As further shown in FIGS. 14-21, the first tabletop 106 and the second tabletop 108 of the portable stand 100 provide a substantially continuous and unobstructed tabletop when the first tabletop 106 and the second tabletop 108 are in the retracted position relative to the frame 104 of the portable stand 100. In the illustrated example of FIGS. 14-21, the first tabletop 106 of the portable stand 100 is spaced apart from the second tabletop 108 of the portable stand 100 by an example retracted lateral distance 1802 when the first tabletop 106 and the second tabletop 108 are in the retracted position associated with the second configuration 1400 shown in FIGS. 14-21. More specifically, the inner lateral edge 140 of the support web 138 of the first tabletop 106 of the portable stand 100 is spaced apart from the inner lateral edge 154 of the support web 152 of the second tabletop 108 of the portable stand 100 by the retracted lateral distance 1802 when the first tabletop 106 and the second tabletop 108 are in the retracted position associated with the second configuration 1400 shown in FIGS. 14-21. In some examples, the retracted lateral distance 1802 is preferably one (1.0) inch or less. In other examples, the retracted lateral distance 1802 is preferably one-half (0.5) of an inch or less. In still other examples, the retracted lateral distance 1802 is preferably one-quarter (0.25) of an inch or less.

The substantially continuous and unobstructed tabletop surface provided by the first tabletop 106 and the second tabletop 108 of the portable stand 100 when the first tabletop 106 and the second tabletop 108 are in the retracted position shown in FIGS. 14-21 advantageously provides another support surface (e.g., as an alternative to the support plate 126 of the frame 104) on which a portable grill (e.g., the portable grill 1300 of FIG. 13) can be seated. In this regard, the portable grill 1300 of FIG. 13 can be seated directly on the first tabletop 106 and the second tabletop 108 of the portable stand 100 when the when the first tabletop 106 and the second tabletop 108 are in the retracted position shown in FIGS. 14-21. In such an example, the portable grill 1300 will preferably be centrally seated on the first tabletop 106 and the second tabletop 108, with a first portion (e.g., the right half) of the base 1302 of the portable grill 1300 being seated on the support web 138 of the first tabletop 106, and a second portion (e.g., the left half) of the base 1302 of the portable grill 1300 being seated on the support web 152 of the second tabletop 108.

The substantially continuous and unobstructed tabletop surface provided by the first tabletop 106 and the second tabletop 108 of the portable stand 100 when the first tabletop 106 and the second tabletop 108 are in the retracted position shown in FIGS. 14-21 can alternatively facilitate use of the portable stand 100 as a serving table. In this regard, the support web 138 of the first tabletop 106 and the support web 152 of the second tabletop 108 can individually or collectively support one or more item(s) that may be utilized in connection with preparing and/or serving food. For example, the support web 138 of the first tabletop 106 and the support web 152 of the second tabletop 108 can individually or collectively support various quantities and/or various types of food items, as well as various quantities and/or various types of preparation, cooking, and/or serving accessories (e.g., boards, pots, pans, platters, plates, bowls, tools, utensils, etc.).

As further shown in FIGS. 14-21, the portable stand 100 includes an example latch assembly 1402 configured to selectively couple the first tabletop 106 of the portable stand 100 to the second tabletop 108 of the portable stand 100 when the first tabletop 106 and the second tabletop 108 of the portable stand 100 are in the retracted position relative to the frame 104 of the portable stand 100. In the illustrated example of FIGS. 14-21, the latch assembly 1402 includes a latch plate pivotally coupled (e.g., via a pin or other fastener) to a portion (e.g., the front support 134) of the first tabletop 106, and a latch post coupled to a portion (e.g., the front support 148) of the second tabletop 108. The latch plate of the latch assembly 1402 includes a notch configured to selectively receive (e.g., via rotation of the latch plate) the post of the latch assembly 1402 when the first tabletop 106 and the second tabletop 108 of the portable stand 100 are in the retracted position shown in FIGS. 14-21. Positioning the latch post of the latch assembly 1402 within the notch of the latch plate of the latch assembly 1402 causes the first tabletop 106 and the second tabletop 108 to be coupled to one another, thereby preventing sliding movement of the first tabletop 106 and/or the second tabletop 108 from the retracted position shown in FIGS. 14-21 to the expanded position shown in FIGS. 1-8.

Figure 22:
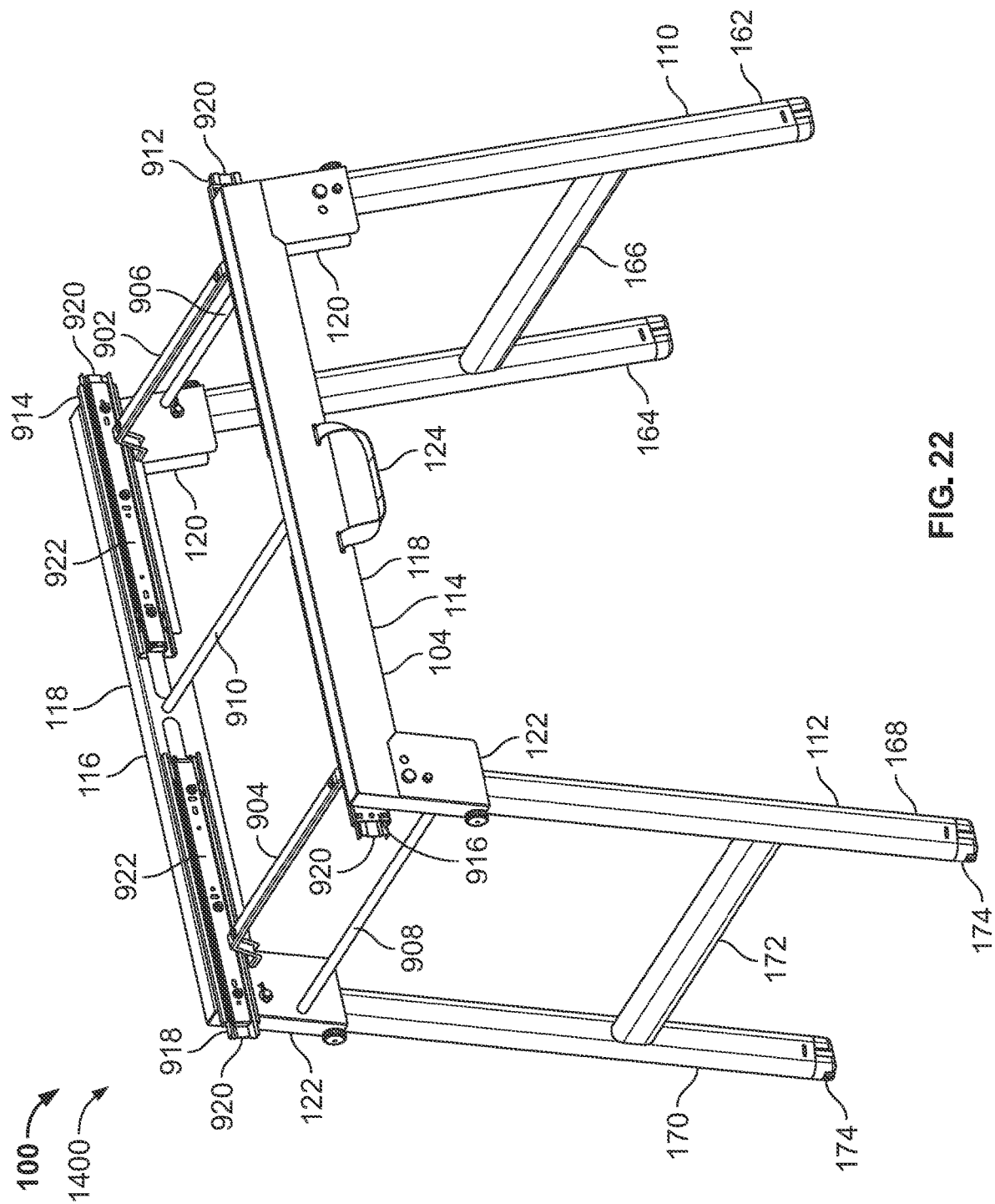
FIG. 22 is a perspective view of the portable stand of FIGS. 1-21, with the portable stand shown positioned in the second configuration of FIGS. 14-21, and with the first tabletop, the second tabletop, and the support plate of the portable stand omitted.
Figure 23:
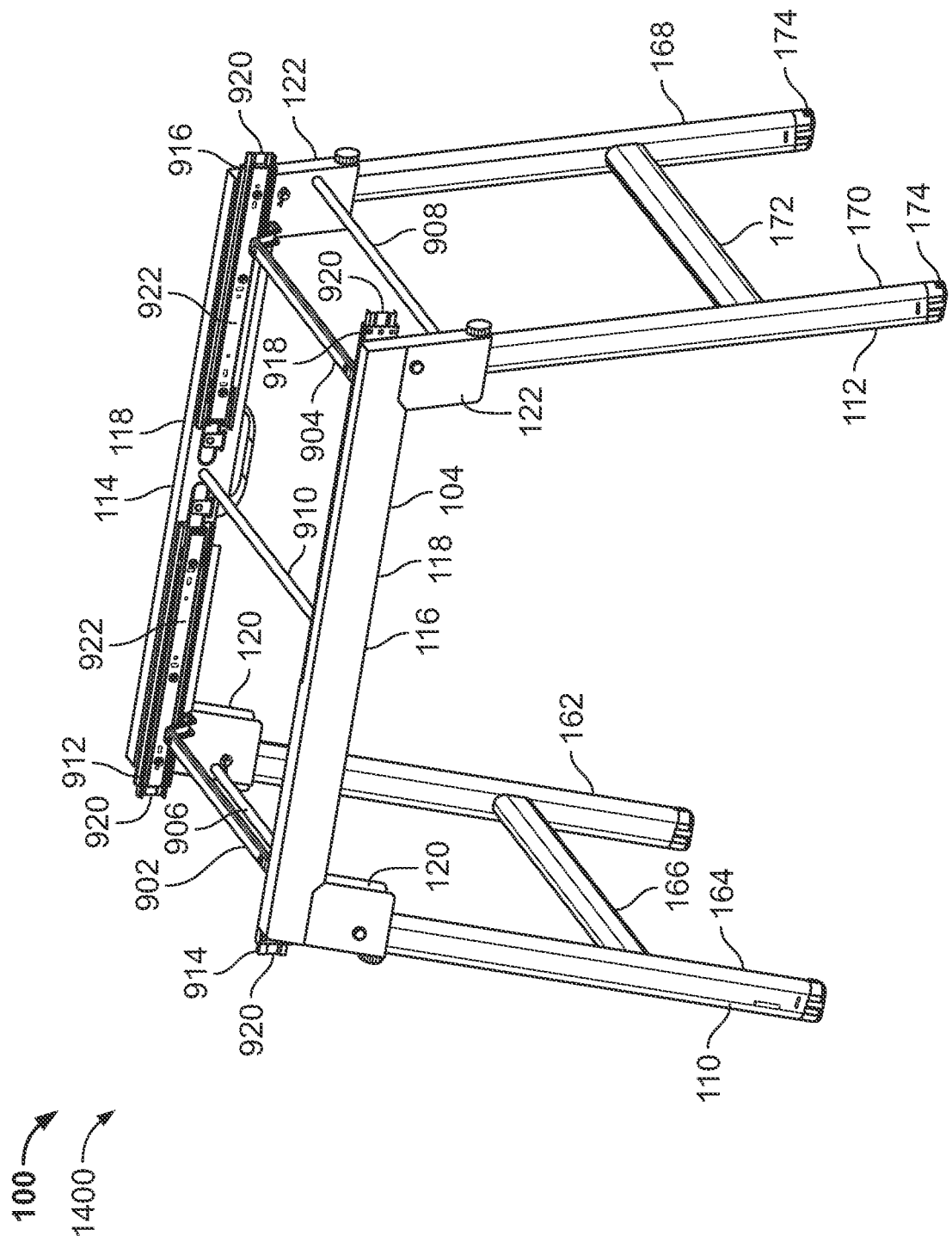
FIG. 23 is another perspective view of the portable stand of FIGS. 1-22, with the portable stand shown positioned in the second configuration of FIGS. 14-22, and with the first tabletop, the second tabletop, and the support plate of the portable stand omitted.
Figure 24:
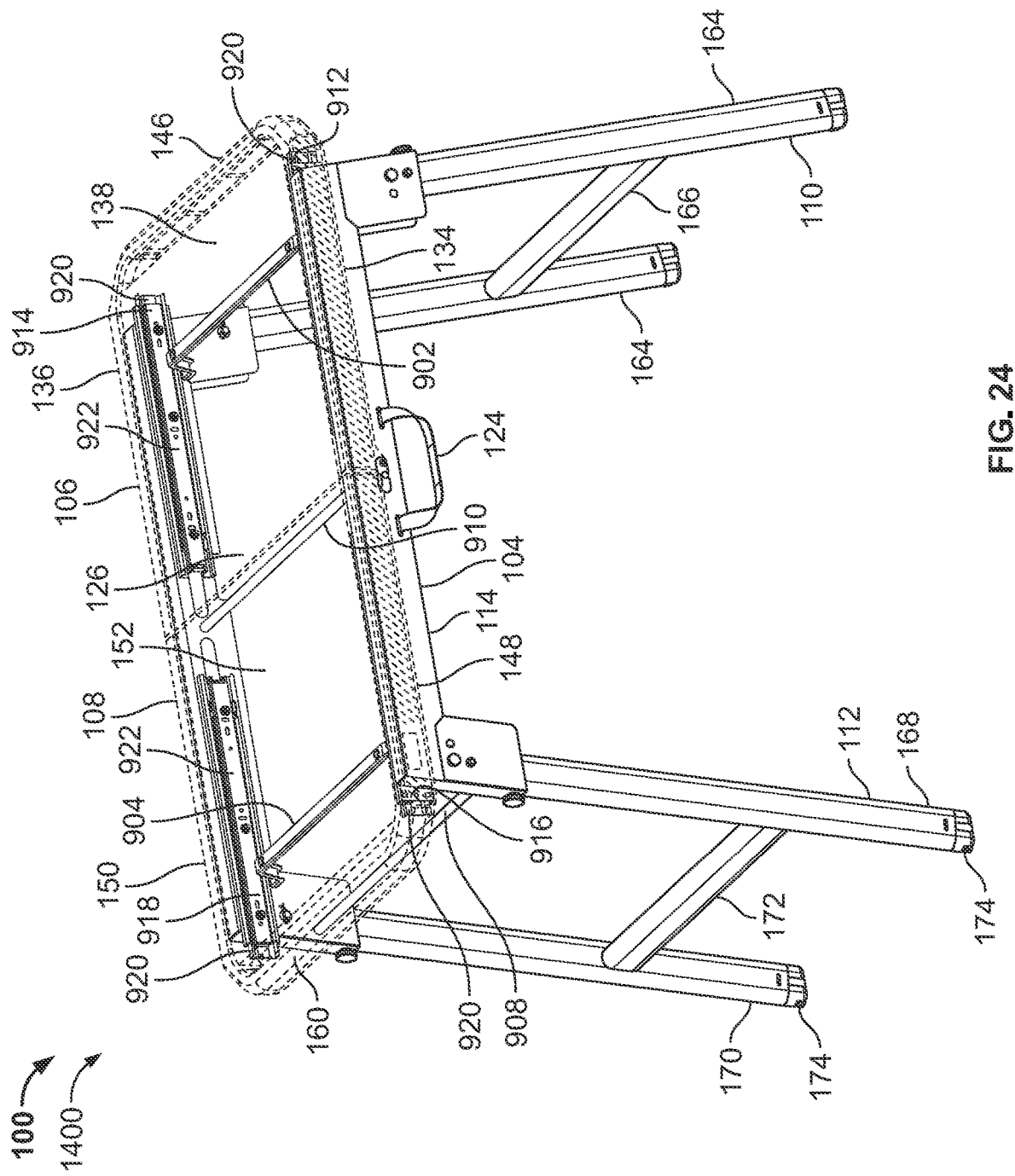
FIG. 24 is another perspective view of the portable stand of FIGS. 1-23, with the portable stand shown positioned in the second configuration of FIGS. 14-23, and with the first tabletop, the second tabletop, and the support plate of the portable stand shown coupled to the frame of the portable stand and illustrated in phantom.

FIGS. 22-24 are provided to enhance the viewability of certain structural components of the above-described frame 104, including components that facilitate slidable movement of the first tabletop 106 and/or the second tabletop 108 of the portable stand 100 relative to the frame 104 of the portable stand 100. FIG. 22 is a perspective view of the portable stand 100 of FIGS. 1-21, with the portable stand 100 shown positioned in the second configuration 1400 of FIGS. 14-21, and with the first tabletop 106, the second tabletop 108, and the support plate 126 of the portable stand 100 omitted. FIG. 23 is another perspective view of the portable stand 100 of FIGS. 1-22, with the portable stand 100 shown positioned in the second configuration 1400 of FIGS. 14-22, and with the first tabletop 106, the second tabletop 108, and the support plate 126 of the portable stand 100 omitted. FIG. 24 is another perspective view of the portable stand 100 of FIGS. 1-23, with the portable stand 100 shown positioned in the second configuration 1400 of FIGS. 14-23, and with the first tabletop 106, the second tabletop 108, and the support plate 126 of the portable stand 100 shown coupled to the frame 104 of the portable stand 100 and illustrated in phantom. As shown in FIGS. 22-24, the first front slider assembly 912, the first rear slider assembly 914, the second front slider assembly 916, and the second rear slider assembly 918 of the frame 104 are each in a retracted position corresponding to the retracted position of the first tabletop 106 and/or the retracted position of the second tabletop 108 associated with the second configuration 1400 of FIGS. 14-21.

Figure 25:
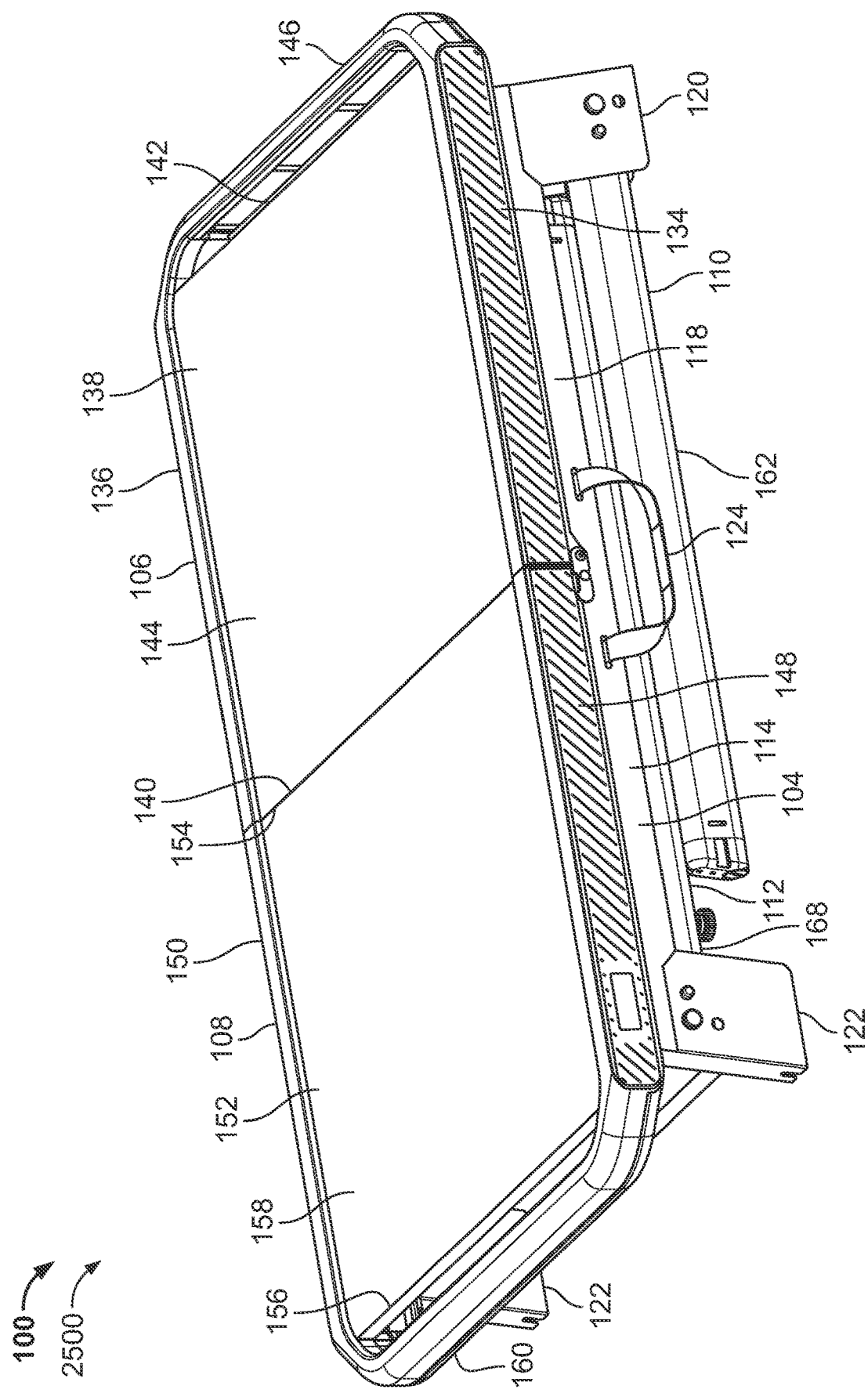
FIG. 25 is a perspective view of the portable stand of FIGS. 1-24, with the portable stand shown positioned in an example third configuration.

FIG. 25 is a perspective view of the portable stand 100 of FIGS. 1-24, with the portable stand 100 shown positioned in an example third configuration 2500. FIG. 26 is a front view of the portable stand 100 of FIGS. 1-25, with the portable stand 100 shown positioned in the third configuration 2500 of FIG. 25. FIG. 27 is a right side view of the portable stand 100 of FIGS. 1-26, with the portable stand 100 shown positioned in the third configuration 2500 of FIGS. 25 and 26. FIG. 28 is a left side view of the portable stand 100 of FIGS. 1-27, with the portable stand 100 shown positioned in the third configuration 2500 of FIGS. 25-27.

When the portable stand 100 is positioned in the third configuration 2500 shown in FIGS. 25-28, the first tabletop 106 and the second tabletop 108 of the portable stand 100 are in the retracted position relative to the frame 104 of the portable stand 100, and the first leg unit 110 and the second leg unit 112 of the portable stand 100 are in the collapsed position relative to the frame 104 of the portable stand 100. When the portable stand 100 is positioned in the third configuration 2500 shown in FIGS. 25-28, the portable stand 100 maintains the second width 1502 associated with the second configuration 1400 of FIGS. 14-21, but transitions to an example second height 2602 that is less than the first height 204 associated with the first configuration 102 of FIGS. 1-8 and the second configuration 1400 of FIGS. 14-21. In the illustrated example of FIGS. 25-28, the second height 2602 of the portable stand 100 is approximately seven inches (e.g., 6.7 inches). In other examples, the second height 2602 of the portable stand 100 can instead be substantially greater than or substantially less than seven inches.

The form factor associated with the third configuration 2500 of the portable stand 100 is relatively compact, and is significantly reduced relative to the substantially larger form factor associated with the first configuration 102 of the portable stand 100 and/or the substantially larger form factor associated with the second configuration 1400 of the portable stand 100, thereby enabling the portable stand 100 to be easily transported between locations and/or stored when not in use. Movement of the portable stand 100 can be performed using the handle 124 of the portable stand 100 when the portable stand 100 is in the third configuration 2500 shown in FIGS. 25-28. The latch assembly 1402 of the portable stand 100 preferably remains engaged (e.g., the latch post of the latch assembly 1402 remains located within the notch of the latch plate of the latch assembly 1402) when the portable stand 100 is in the third configuration 2500 shown in FIGS. 25-28, thereby preventing movement of the first tabletop 106 and/or the second tabletop 108 of the portable stand 100 during transportation of the portable stand 100.

Figure 29:
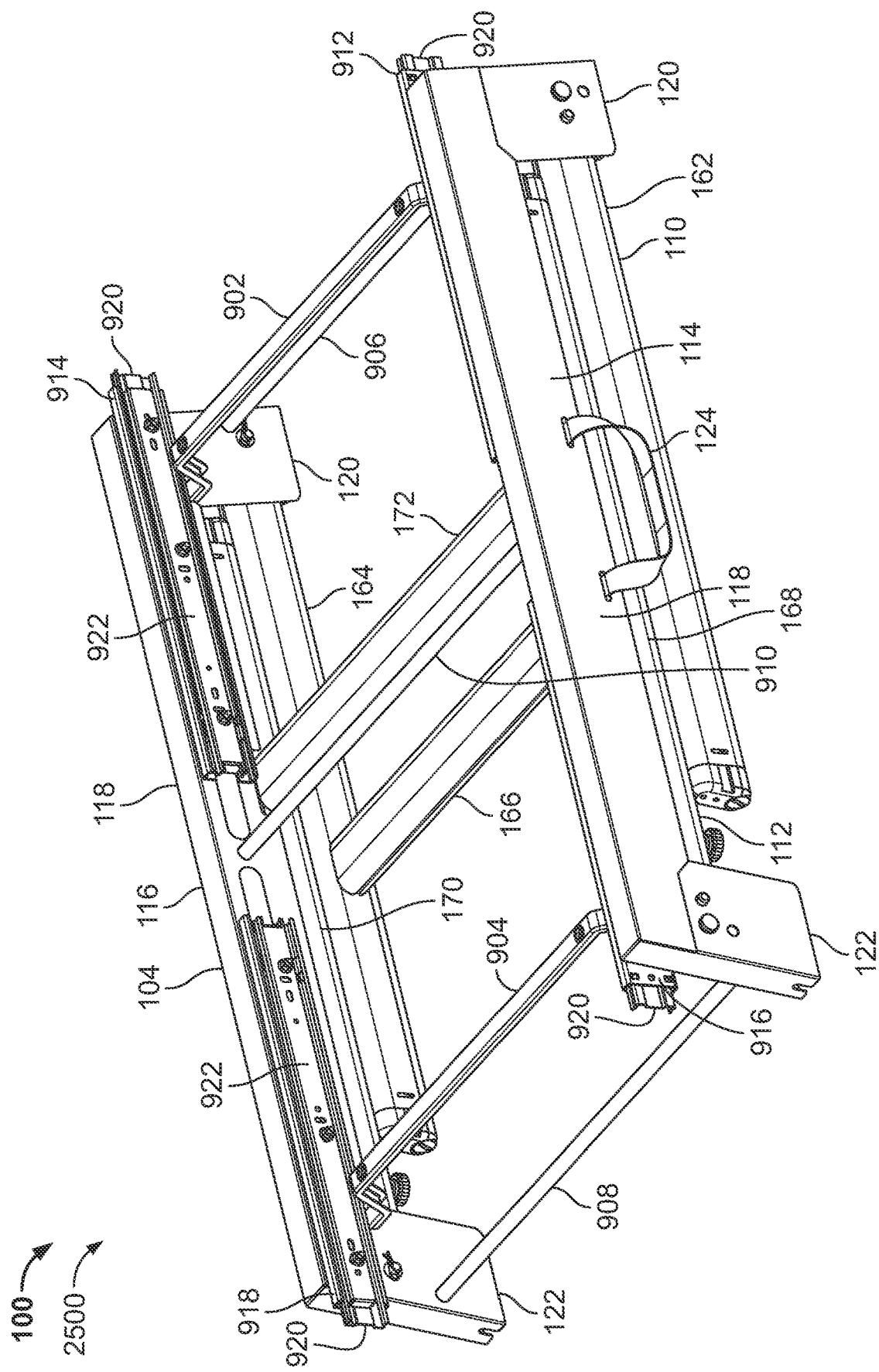
FIG. 29 is a perspective view of the portable stand of FIGS. 1-28, with the portable stand shown positioned in the third configuration of FIGS. 25-28, and with the first tabletop, the second tabletop, and the support plate of the portable stand omitted.
Figure 30:
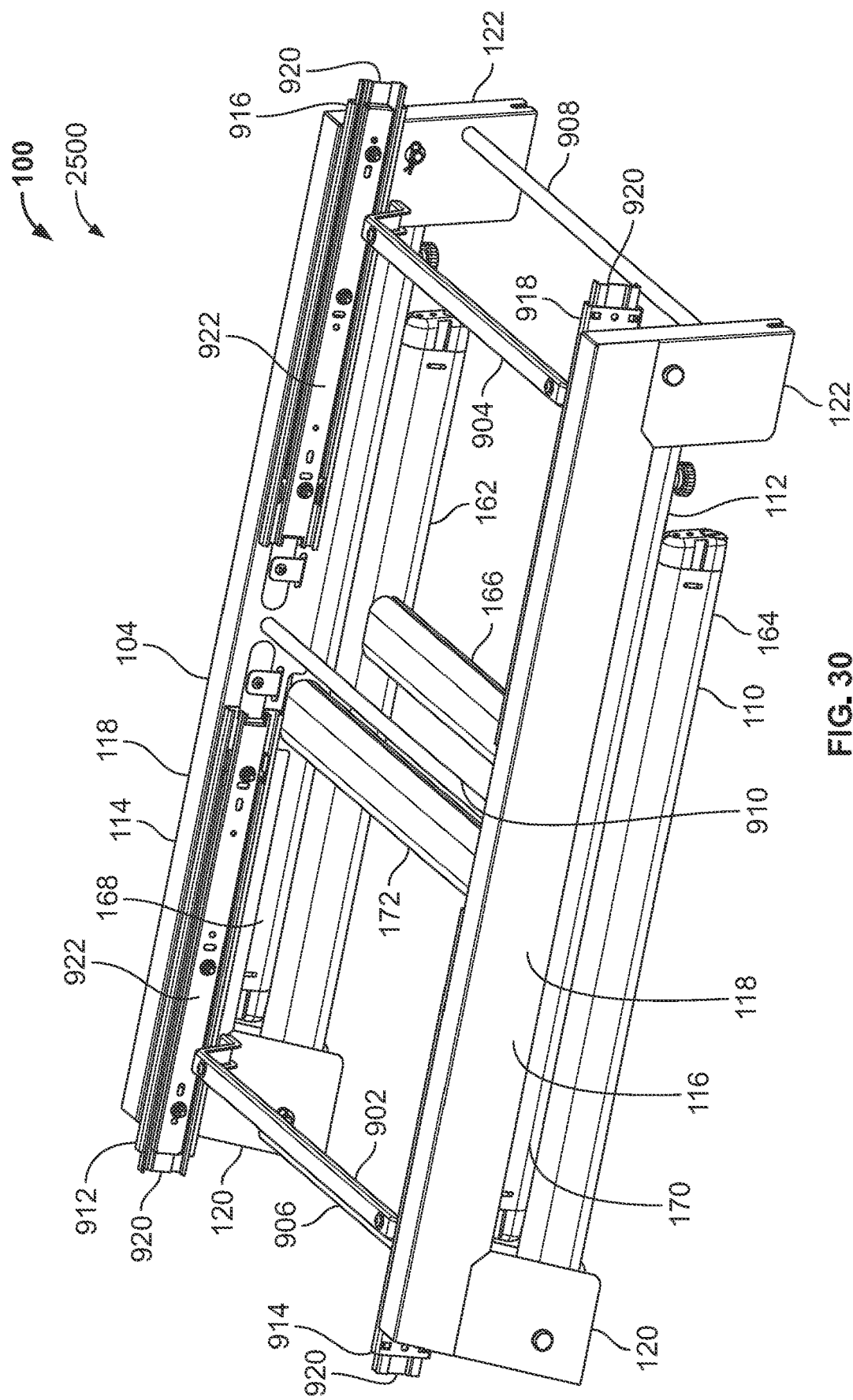
FIG. 30 is another perspective view of the portable stand of FIGS. 1-29, with the portable stand shown positioned in the third configuration of FIGS. 25-29, and with the first tabletop, the second tabletop, and the support plate of the portable stand omitted.
Figure 31:
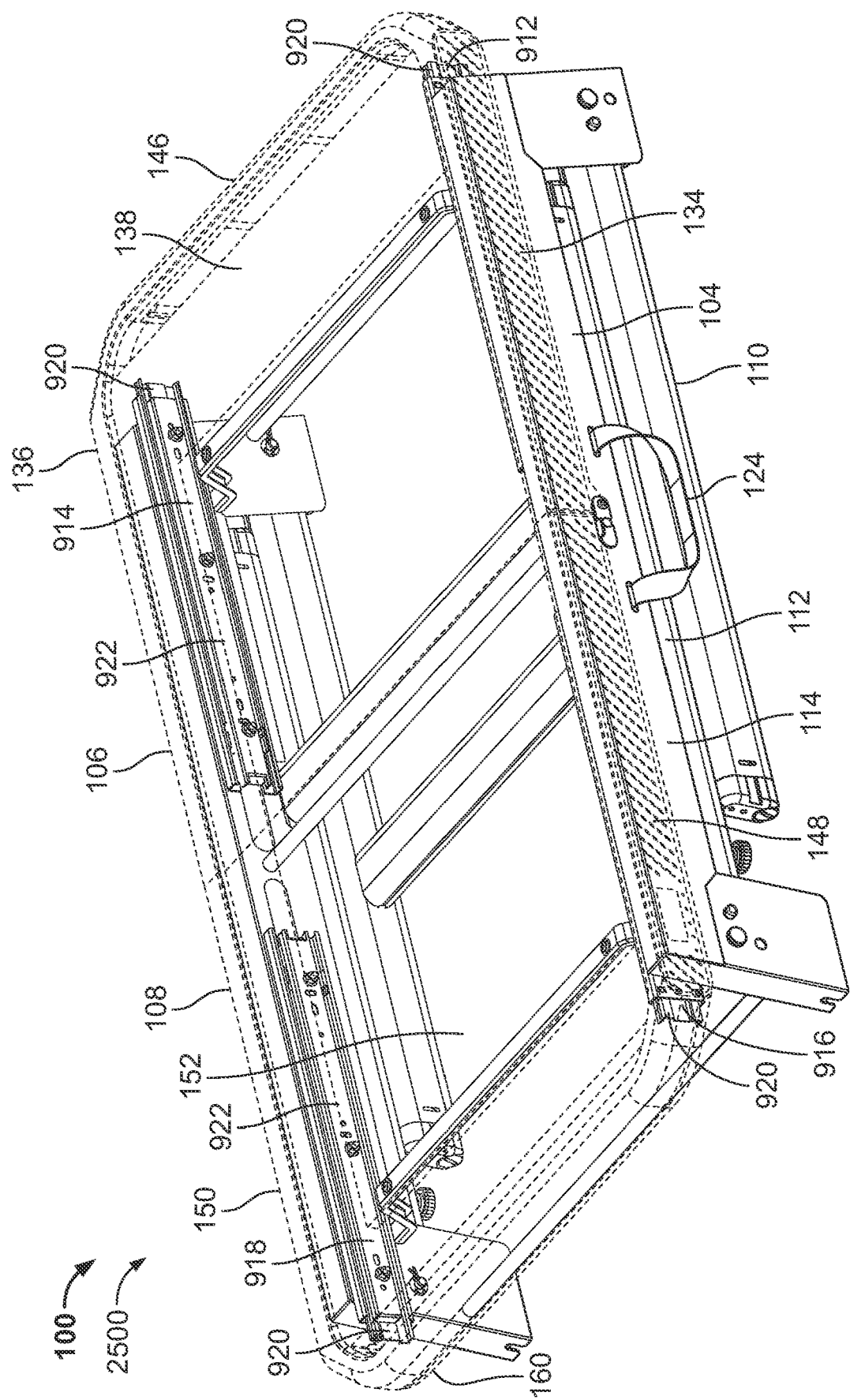
FIG. 31 is another perspective view of the portable stand of FIGS. 1-30, with the portable stand shown positioned in the third configuration of FIGS. 25-30, and with the first tabletop, the second tabletop, and the support plate of the portable stand shown coupled to the frame of the portable stand and illustrated in phantom.

FIGS. 29-31 are provided to enhance the viewability of certain structural components of the above-described frame 104, including components that facilitate slidable movement of the first tabletop 106 and/or the second tabletop 108 of the portable stand 100 relative to the frame 104 of the portable stand 100. FIG. 29 is a perspective view of the portable stand 100 of FIGS. 1-28, with the portable stand 100 shown positioned in the third configuration 2500 of FIGS. 25-28, and with the first tabletop 106, the second tabletop 108, and the support plate 126 of the portable stand 100 omitted. FIG. 30 is another perspective view of the portable stand 100 of FIGS. 1-29, with the portable stand 100 shown positioned in the third configuration 2500 of FIGS. 25-29, and with the first tabletop 106, the second tabletop 108, and the support plate 126 of the portable stand 100 omitted. FIG. 31 is another perspective view of the portable stand 100 of FIGS. 1-30, with the portable stand 100 shown positioned in the third configuration 2500 of FIGS. 25-30, and with the first tabletop 106, the second tabletop 108, and the support plate 126 of the portable stand 100 shown coupled to the frame 104 of the portable stand 100 and illustrated in phantom. As shown in FIGS. 29-31, the first front slider assembly 912, the first rear slider assembly 914, the second front slider assembly 916, and the second rear slider assembly 918 of the frame 104 are each in a retracted position corresponding to the retracted position of the first tabletop 106 and/or the retracted position of the second tabletop 108 associated with the third configuration 2500 of FIGS. 25-28.

Figure 32:
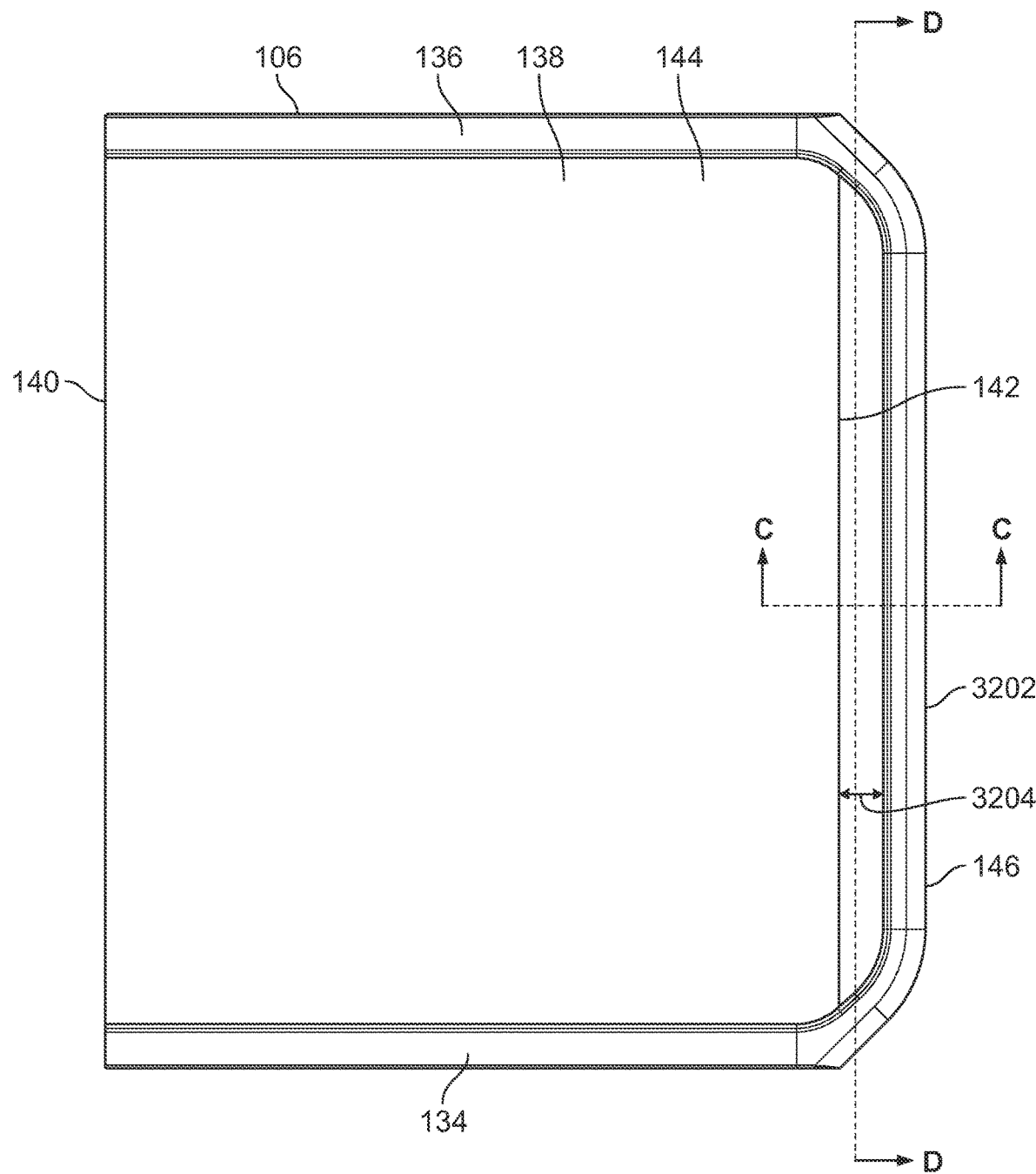
FIG. 32 is a top view of the first tabletop of the portable stand of FIGS. 1-31.
Figure 33:
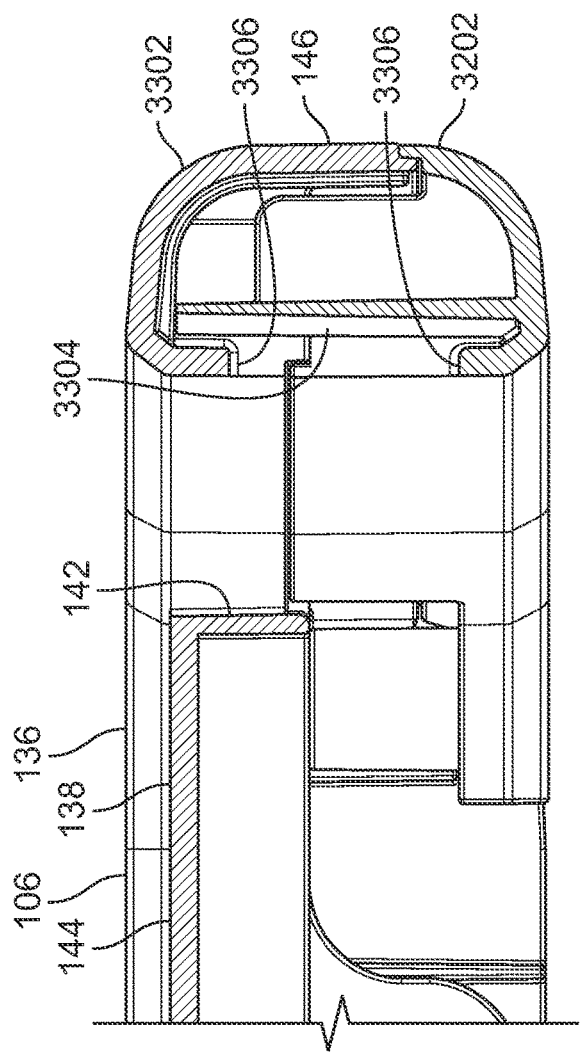
FIG. 33 is a cross-sectional view of the first tabletop of FIG. 32 taken along section C-C of FIG. 32.
Figure 34:
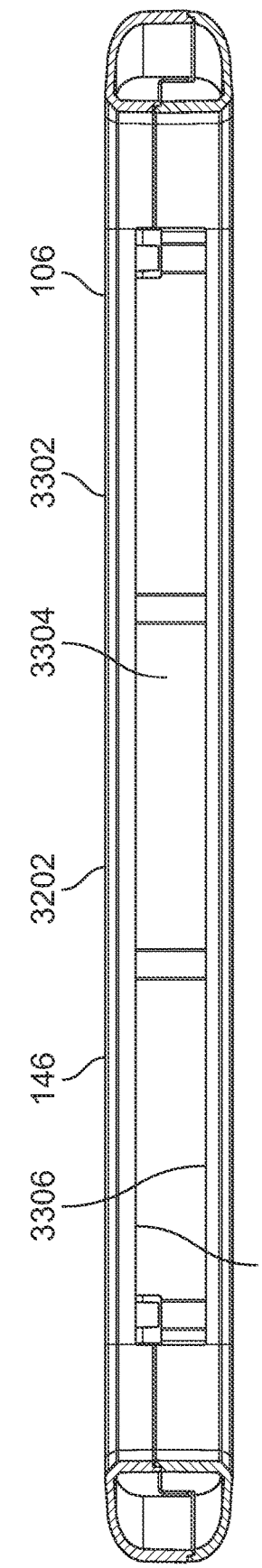
FIG. 34 is a cross-sectional view of the first tabletop of FIGS. 32 and 33 taken along section D-D of FIG. 32.

FIG. 32 is a top view of the first tabletop 106 of the portable stand 100 of FIGS. 1-31. FIG. 33 is a cross-sectional view of the first tabletop 106 of FIG. 32 taken along section C-C of FIG. 32. FIG. 34 is a cross-sectional view of the first tabletop 106 of FIGS. 32 and 33 taken along section D-D of FIG. 32. As shown in FIGS. 32-34, the first tabletop 106 includes the front support 134, the rear support 136, the support web 138 (e.g., including the inner lateral edge 140 and the outer lateral edge 142), and the accessory rail 146, all as described above in connection with FIGS. 1-8 and/or FIGS. 14-21. In the illustrated example of FIGS. 32-34, the accessory rail 146 of the first tabletop 106 is coupled to (e.g., integrally formed with) and extends between the front support 134 and the rear support 136 of the first tabletop 106, with the accessory rail 146 being located along and spaced apart from the outer lateral edge 142 of the support web 138 of the first tabletop 106. More specifically, the accessory rail 146 includes an example accessory mounting segment 3202 that extends along the outer lateral edge 142 of the support web 138 of the first tabletop 106, with the accessory mounting segment 3202 of the accessory rail 146 being spaced apart from the outer lateral edge 142 of the support web 138 by an example gap 3204.

As shown in FIGS. 33 and 34, the accessory mounting segment 3202 of the accessory rail 146 has a cross-sectional profile that includes an example contoured outer surface 3302, an example recessed inner surface 3304, and one or more example engagement surface(s) 3306 located between the contoured outer surface 3302 and the recessed inner surface 3304. The contoured outer surface 3302 and/or the engagement surface(s) 3306 of the accessory mounting segment 3202 of the accessory rail 146 is/are configured to be engaged by one or more portion(s) of a connector of an accessory to removably couple the accessory to the accessory rail 146 (e.g., via a snap fit), as further described below.

While FIGS. 32-34 described above are specifically directed to the accessory rail 146 of the first tabletop 106 of the portable stand 100, it is to be understood that the accessory rail 160 of the second tabletop 108 of the portable stand 100 is constructed in a substantially identical manner (e.g., as a mirror image of the accessory rail 146 of the first tabletop 106). The accessory rail 160 of the second tabletop 108 of the portable stand 100 accordingly also includes an accessory mounting segment having a contoured outer surface, a recessed inner surface, and one or more engagement surface(s) corresponding in size and/or shape to the contoured outer surface 3302, the recessed inner surface 3304, and the one or more engagement surface(s) 3306 of the accessory mounting segment 3202 of the accessory rail 146 of the first tabletop 106.

Figure 35:
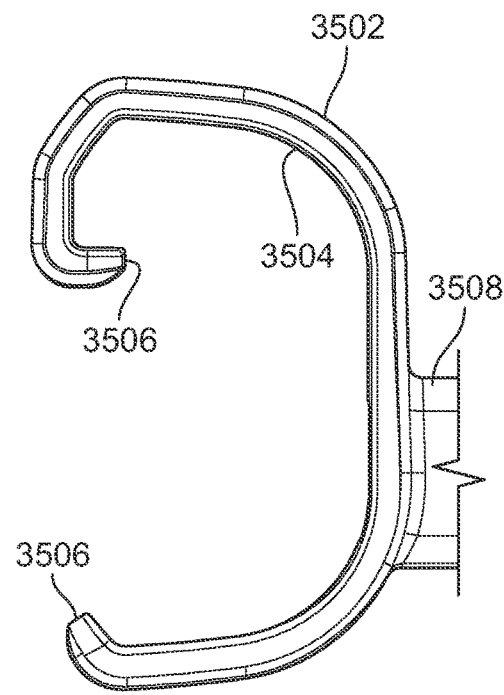
FIG. 35 is a side view of an example connector constructed in accordance with the teachings of this disclosure.

FIG. 35 is a side view of an example connector 3502 constructed in accordance with the teachings of this disclosure. The connector 3502 of FIG. 35 can be incorporated into (e.g., integrally formed with) various accessories (e.g., a tool hook, a caddy, a bottle holder, a roll holder, a bag holder, etc.) to facilitate removably coupling the accessory to the accessory mounting segment 3202 of the accessory rail 146 of the first tabletop 106 and/or to the corresponding accessory mounting segment of the accessory rail 160 of the second tabletop 108. In the illustrated example of FIG. 35, the connector 3502 includes an example contoured inner surface 3504, one or more example engagement tab(s) 3506, and a coupler 3508. The contoured inner surface 3504 of the connector 3502 is configured to be complementary in size and shape relative to the contoured outer surface 3302 of the accessory mounting segment 3202 of the accessory rail 146 of the first tabletop 106, and/or relative to the contoured outer surface of the corresponding accessory mounting segment of the accessory rail 160 of the second tabletop 108. The engagement tab(s) 3506 of the connector 3502 is/are configured to contact corresponding ones of the engagement surface(s) 3306 of the accessory mounting segment 3202 of the accessory rail 146 of the first tabletop 106, and/or corresponding ones of the engagement surface(s) of the corresponding accessory mounting segment of the accessory rail 160 of the second tabletop 108. The coupler 3508 of the connector 3502 is configured to facilitate attachment of the connector 3502 to an accessory.

Figure 36:
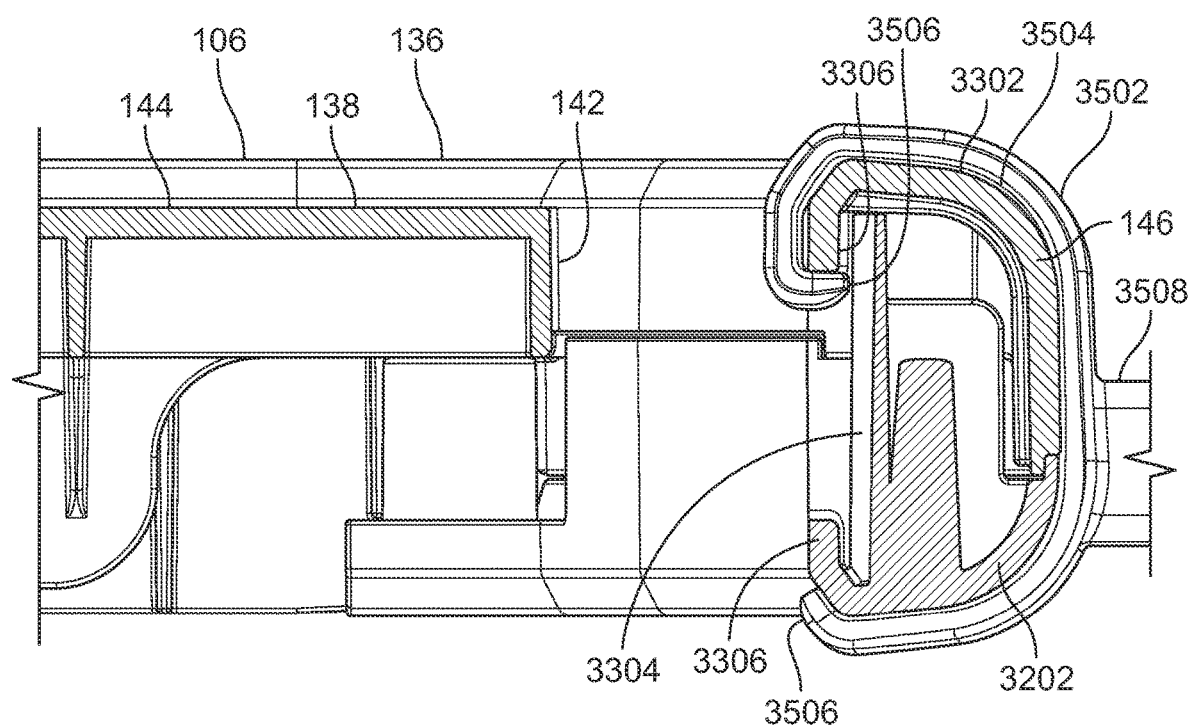
FIG. 36 is a cross-sectional view of the first tabletop of FIGS. 32-34 taken along section C-C of FIG. 32, with the connector of FIG. 35 shown coupled to the accessory rail of the first tabletop.

FIG. 36 is a cross-sectional view of the first tabletop 106 of FIGS. 32-34 taken along section C-C of FIG. 32, with the connector 3502 of FIG. 35 shown coupled to the accessory rail 146 of the first tabletop 106. In the illustrated example of FIG. 36, the contoured inner surface 3504 of the connector 3502 contacts and/or otherwise engages the contoured outer surface 3302 of the accessory mounting segment 3202 of the accessory rail 146 of the first tabletop 106. As further shown in FIG. 36, the engagement tab(s) 3506 of the connector 3502 contact and/or otherwise engage corresponding ones of the engagement surface(s) 3306 of the accessory mounting segment 3202 of the accessory rail 146 of the first tabletop 106, thereby removably coupling (e.g., via a snap fit) the connector 3502 to the accessory rail 146 of the first tabletop 106.

While FIG. 36 described above is specifically directed to the accessory rail 146 of the first tabletop 106 of the portable stand 100, it is to be understood that the connector 3502 of FIG. 35 is removably couplable to the accessory rail 160 of the second tabletop 108 of the portable stand 100 is a manner that is substantially identical relative to that shown in FIG. 36 and described above. For example, when the connector 3502 of FIG. 35 is removably coupled (e.g., via a snap fit) to the accessory rail 160 of the second tabletop 108 of the portable stand 100, the contoured inner surface 3504 of the connector 3502 contacts and/or otherwise engages the contoured outer surface of the corresponding accessory mounting segment of the accessory rail 160 of the second tabletop 108, and the engagement tab(s) 3506 of the connector 3502 contact and/or otherwise engage corresponding ones of the engagement surface(s) of the corresponding accessory mounting segment of the accessory rail 160 of the second tabletop 108.

Figure 37:
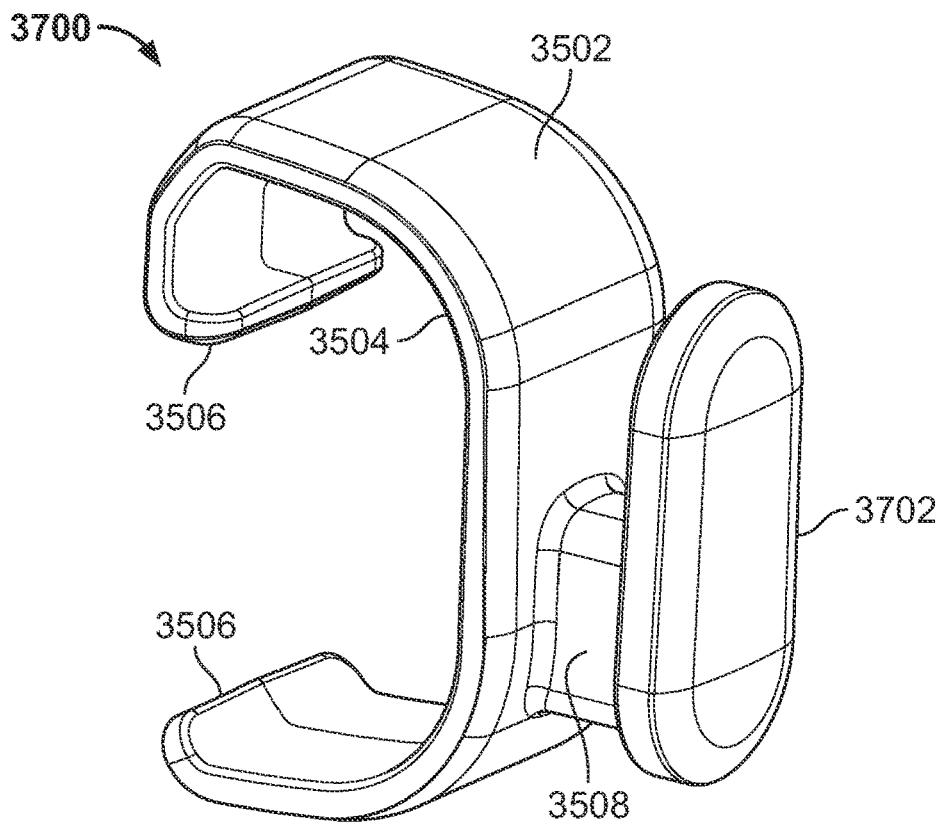
FIG. 37 is a perspective view of an example tool hook.
Figure 38:
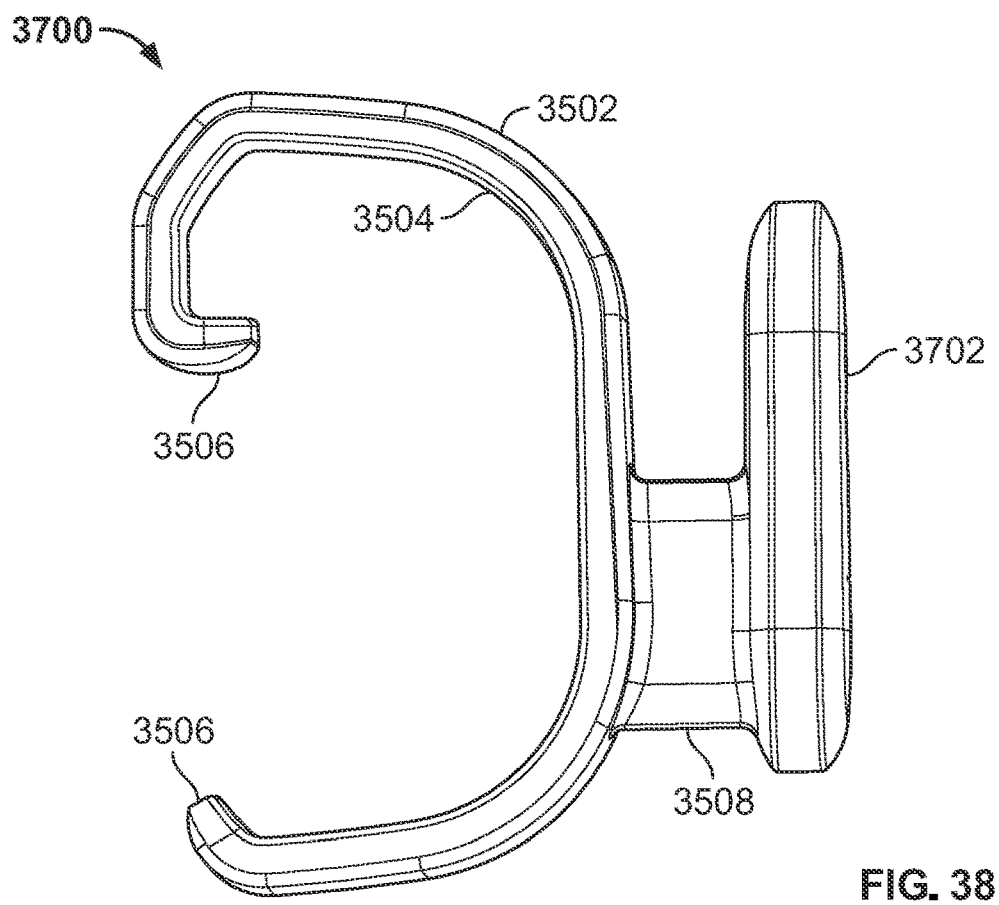
FIG. 38 is a side view of the tool hook of FIG. 37.

FIG. 37 is a perspective view of an example tool hook 3700. FIG. 38 is a side view of the tool hook 3700 of FIG. 37. In the illustrated example of FIGS. 37 and 38, the tool hook 3700 includes an instance of the connector 3502 of FIG. 35, including the contoured inner surface 3504, the engagement tab(s) 3506, and the coupler 3508 thereof. The tool hook 3700 further includes an example hook portion 3702 extending from the coupler 3508 of the connector 3502. The coupler 3508 and the hook portion 3702 of the tool hook 3700 of FIGS. 37-38 are configured to support a variety of tools and/or utensils in a suspended manner (e.g., via a string or a hook of the tool or utensil), such that the tool or the utensil hangs downwardly from the coupler 3508 and/or from the hook portion 3702.

The contoured inner surface 3504 of the connector 3502 of the tool hook 3700 of FIGS. 37-38 is configured to contact and/or otherwise engage the contoured outer surface 3302 of the accessory mounting segment 3202 of the accessory rail 146 of the first tabletop 106, and/or the contoured outer surface of the corresponding accessory mounting segment of the accessory rail 160 of the second tabletop 108. The engagement tab(s) 3506 of the connector 3502 of the tool hook 3700 of FIGS. 37-38 is/are configured to contact and/or otherwise engage corresponding ones of the engagement surface(s) 3306 of the accessory mounting segment 3202 of the accessory rail 146 of the first tabletop 106, and/or corresponding ones of the engagement surface(s) of the corresponding accessory mounting segment of the accessory rail 160 of the second tabletop 108. The tool hook 3700 of FIG. 37 can accordingly be removably coupled (e.g., via a snap fit) to the accessory rail 146 of the first tabletop 106 and/or to the accessory rail 160 of the second tabletop 108.

Figure 39:
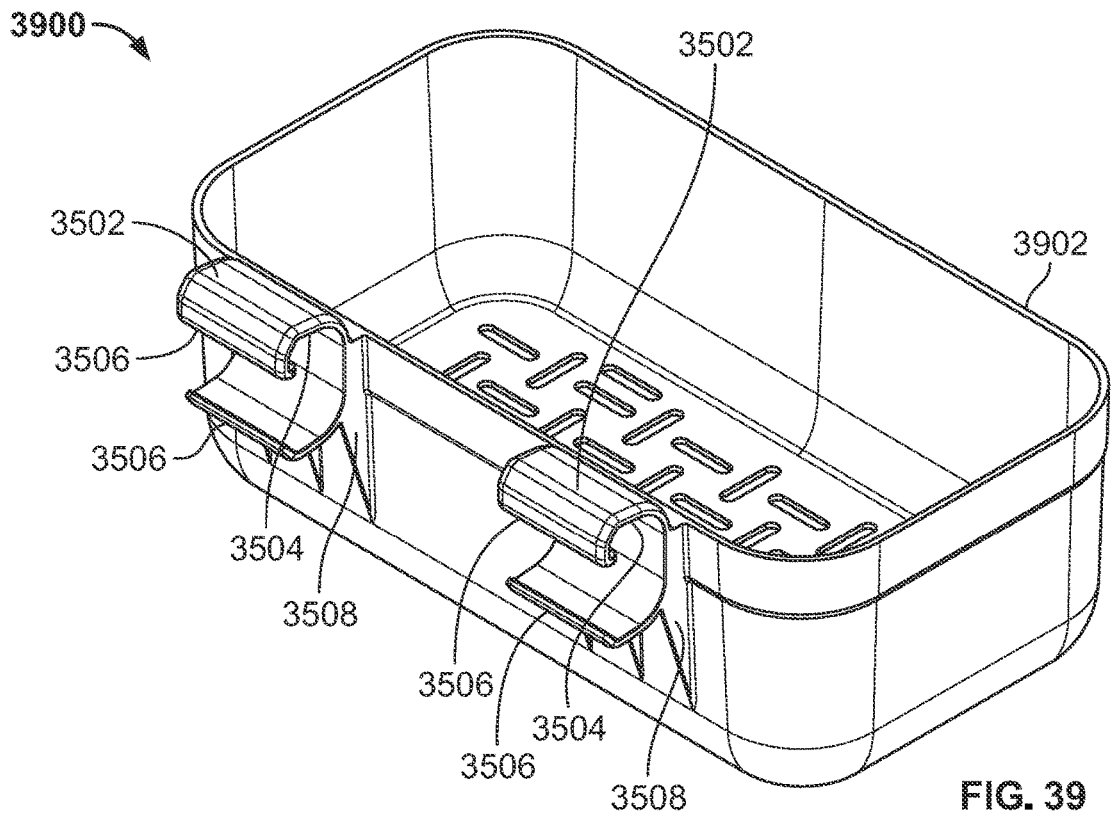
FIG. 39 is a perspective view of an example caddy.
Figure 40:
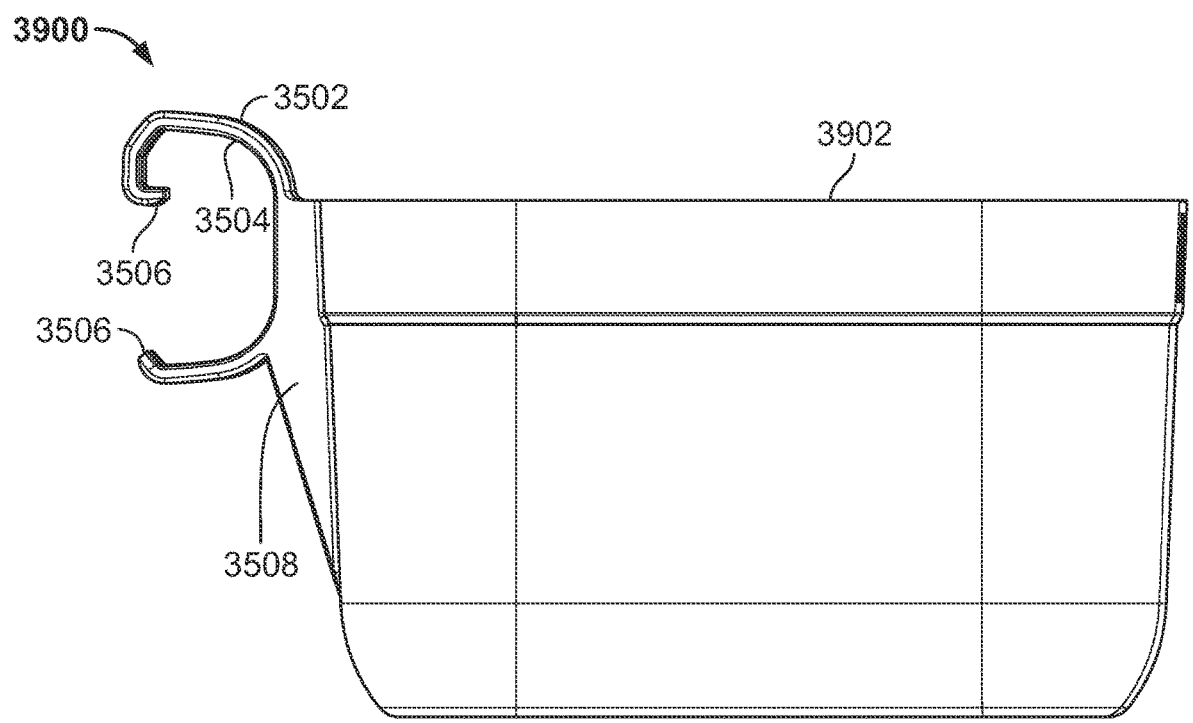
FIG. 40 is a side view of the caddy of FIG. 39.

FIG. 39 is a perspective view of an example caddy 3900. FIG. 40 is a side view of the caddy 3900 of FIG. 39. In the illustrated example of FIGS. 39 and 40, the caddy 3900 includes two instances of the connector 3502 of FIG. 35, with each such instance including the contoured inner surface 3504, the engagement tab(s) 3506, and the coupler 3508 thereof. The caddy 3900 further includes an example basket portion 3902 extending from the coupler 3508 of each connector 3502. The basket portion 3902 of the caddy 3900 is configured to hold, carry, contain, and/or otherwise support one or more item(s) (e.g., bottles, jars, cans, packets, utensils, napkins, etc.) that may be utilized in connection with preparing, cooking, and/or serving food.

The contoured inner surface 3504 of each connector 3502 of the caddy 3900 of FIGS. 39-40 is configured to contact and/or otherwise engage the contoured outer surface 3302 of the accessory mounting segment 3202 of the accessory rail 146 of the first tabletop 106, and/or the contoured outer surface of the corresponding accessory mounting segment of the accessory rail 160 of the second tabletop 108. The engagement tab(s) 3506 of each connector 3502 of the caddy 3900 of FIGS. 39-40 is/are configured to contact and/or otherwise engage corresponding ones of the engagement surface(s) 3306 of the accessory mounting segment 3202 of the accessory rail 146 of the first tabletop 106, and/or corresponding ones of the engagement surface(s) of the corresponding accessory mounting segment of the accessory rail 160 of the second tabletop 108. The caddy 3900 of FIGS. 39-40 can accordingly be removably coupled (e.g., via a snap fit) to the accessory rail 146 of the first tabletop 106 and/or to the accessory rail 160 of the second tabletop 108.

Figure 41:
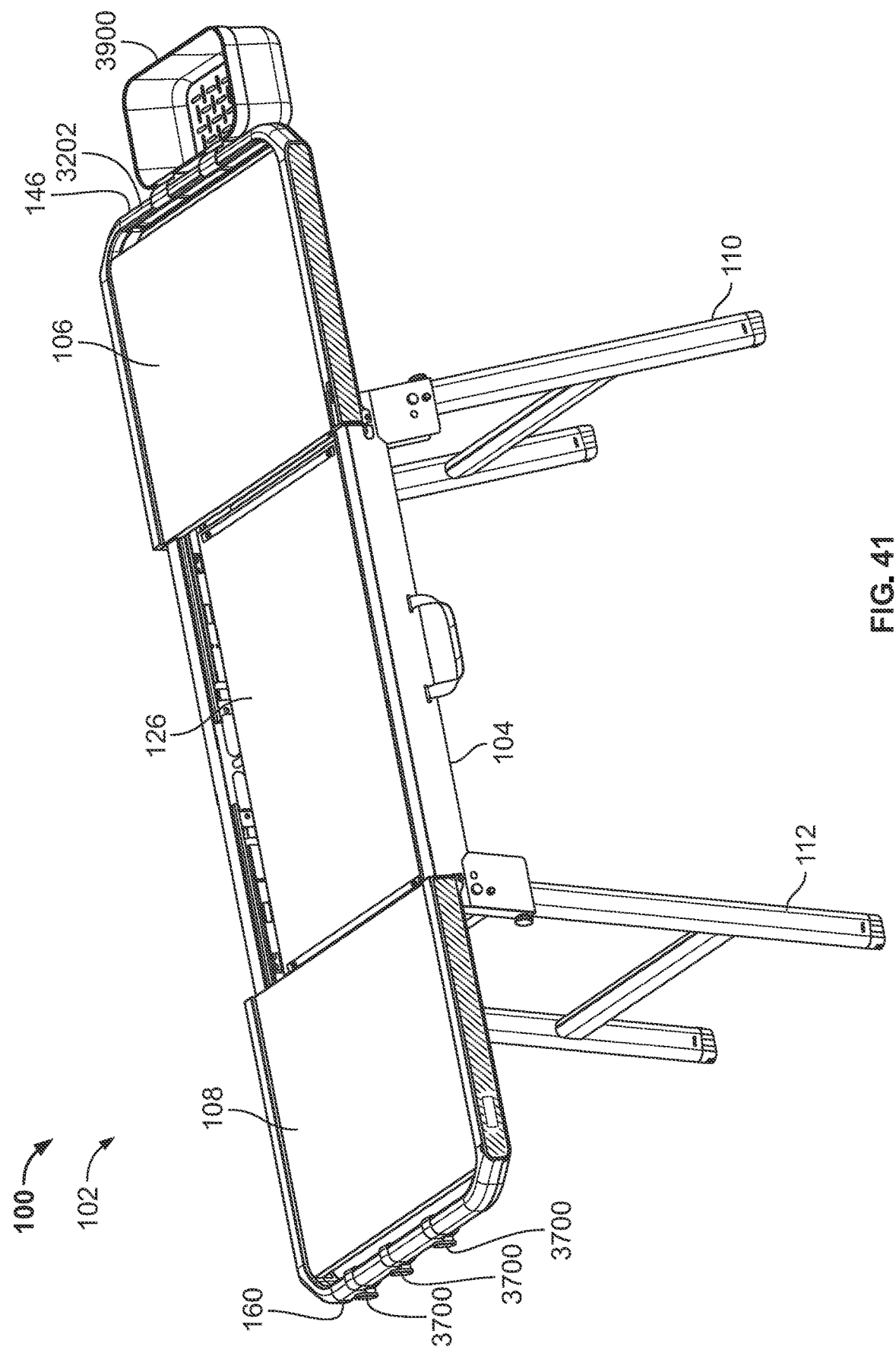
FIG. 41 is a perspective view of the portable stand of FIGS. 1-31, with the portable stand shown positioned in the first configuration of FIGS. 1-13, with the caddy of FIGS. 39 and 40 shown attached to the accessory rail of the first tabletop of the portable stand, and with the tool hook of FIGS. 37 and 38 shown attached to the accessory rail of the second tabletop of the portable stand.

FIG. 41 is a perspective view of the portable stand 100 of FIGS. 1-31, with the portable stand 100 shown positioned in the first configuration 102 of FIGS. 1-13, with the caddy 3900 of FIGS. 39-40 shown attached to the accessory rail 146 of the first tabletop 106 of the portable stand 100, and with the tool hook 3700 of FIGS. 37-38 shown attached to the accessory rail 160 of the second tabletop 108 of the portable stand 100. FIG. 41 demonstrates that different types of accessories can be removably coupled to different ones of the accessory rail 146 of the first tabletop 106 and the accessory rail 160 of the second tabletop 108 at the same time. For example, as shown in FIG. 41, the caddy 3900 of FIGS. 39-40 is removably coupled to the accessory rail 146 of the first tabletop 106, and the tool hook 3700 of FIGS. 37-38 is removably coupled to the accessory rail 160 of the second tabletop 108. FIG. 41 also demonstrates that multiple instances of an accessory can be removably coupled to either the accessory rail 146 of the first tabletop 106 or the accessory rail 160 of the second tabletop 108 at the same time. For example, as shown in FIG. 41, three separate instances of the tool hook 3700 of FIGS. 37-38 are removably coupled to the accessory rail 160 of the second tabletop 108.

Various accessories (e.g., the tool hook 3700 of FIGS. 37-38, the caddy 3900 of FIGS. 39-40, a bottle holder, a roll holder, a bag holder, etc.) incorporating the connector 3502 of FIG. 35 can advantageously be removably coupled (e.g., via a snap fit) in an interchangeable manner to the accessory rail 146 of the first tabletop 106 and/or the accessory rail 160 of the second tabletop 108 of the portable stand 100. For example, although FIG. 41 illustrates the caddy 3900 of FIGS. 39-40 removably coupled to the accessory rail 146 of the first tabletop 106 and the tool hook 3700 of FIGS. 37-38 removably coupled to the accessory rail 160 of the second tabletop 108, the interchangeable nature of such accessories provides that the caddy 3900 of FIGS. 39-40 can alternatively be removably coupled to the accessory rail 160 of the second tabletop 108 and the tool hook 3700 of FIGS. 37-38 can alternatively be removably coupled to the accessory rail 146 of the first tabletop 106. The interchangeable nature of the above-described accessory rail mounting system provides a user of the portable stand 100 with substantial flexibility in terms of customizing the arrangement of accessories that are attached to the accessory rail 146 of the first tabletop 106 of the portable stand 100 and/or the accessory rail 160 of the second tabletop 108 of the portable stand 100 at any given time to suit the user's current and/or future needs.

The following paragraphs provide various examples in relation to the disclosed portable stands for portable grills.

Example 1 includes a portable stand for a portable grill. In Example 1, the portable stand includes a frame and first and second tabletops. In Example 1, the frame includes a front support, a rear support spaced apart from the front support, and a support plate located between the front support and the rear support. In Example 1, the support plate has a first lateral portion and a second lateral portion. In Example 1, the first and second tabletops are slidable relative to the frame between an expanded position and a retracted position. In Example 1, the first and second tabletops are configured to reveal corresponding ones of the first and second lateral portions of the support plate when the first and second tabletops are in the expanded position. In Example 1, the first and second tabletops are configured to conceal the corresponding ones of the first and second lateral portions of the support plate when the first and second tabletops are in the retracted position.

Example 2 includes the portable stand of Example 1. In Example 2, the first and second tabletops are configured to provide corresponding first and second side tables relative to the portable grill when the first and second tabletops are in the expanded position and the portable grill is seated on the support plate.

Example 3 includes the portable stand of Example 1. In Example 3, the first and second tabletops are configured to provide a substantially continuous and unobstructed tabletop when the first and second tabletops are in the retracted position.

Example 4 includes the portable stand of Example 1. In Example 4, the second tabletop is spaced apart from the first tabletop by a retracted lateral distance of one inch or less when the first and second tabletops are in the retracted position, and the second tabletop is spaced apart from the first tabletop by an expanded lateral distance of twelve inches or more when the first and second tabletops are in the expanded position.

Example 5 includes the portable stand of Example 1. In Example 5, the first and second lateral portions of the support plate form a continuous planar surface.

Example 6 includes the portable stand of Example 1. In Example 6, an upper surface of the support plate is located below an upper surface of the first tabletop and below an upper surface of the second tabletop.

Example 7 includes the portable stand of Example 1. In Example 7, the frame further includes first and second front slider assemblies coupled to the front support, and first and second rear slider assemblies coupled to the rear support. In Example 7, the first tabletop is coupled to the first front slider assembly and the first rear slider assembly, and the second tabletop is coupled to the second front slider assembly and the second rear slider assembly. In Example 7, the first front slider assembly and the first rear slider assembly facilitate sliding the first tabletop relative to the frame between the expanded position and the retracted position, and the second front slider assembly and the second rear slider assembly facilitate sliding the second tabletop relative to the frame between the expanded position and the retracted position.

Example 8 includes the portable stand of Example 1. In Example 8, the portable stand further comprises a latch assembly configured to selectively couple the first tabletop to the second tabletop when the first and second tabletops are in the retracted position.

Example 9 includes the portable stand of Example 1. In Example 9, the portable stand further comprises first and second leg units extending between and pivotally coupled to the front and rear supports of the frame. In Example 9, the first and second leg units are moveable relative to the frame between an erected position and a collapsed position.

Example 10 includes the portable stand of Example 9. In Example 10, the portable stand has a first height when the first and second leg units are in the erected position and a second height when the first and second leg units are in the collapsed position. In Example 10, the second height is less than the first height.

Example 11 includes the portable stand of Example 9. In Example 11, the first and second leg units each include one or more adjustable feet configured to level the frame.

Example 12 includes the portable stand of Example 9. In Example 12, the portable stand is configured to be transitioned between a first configuration, a second configuration, and a third configuration. In Example 12, the first and second leg units are in the erected position and the first and second tabletops are in the expanded position when the portable stand is positioned in the first configuration. In Example 12, the first and second leg units are in the erected position and the first and second tabletops are in the retracted position when the portable stand is positioned in the second configuration. In Example 12, the first and second leg units are in the collapsed position and the first and second tabletops are in the retracted position when the portable stand is in the third configuration.

Example 13 includes the portable stand of Example 1. In Example 13, the portable stand further comprises a first accessory rail coupled to the first tabletop. In Example 13, the first accessory rail includes a first accessory mounting segment spaced apart from and extending along an outer lateral edge of a support web of the first tabletop.

Example 14 includes the portable stand of Example 13. In Example 14, the first accessory mounting segment is configured to be engaged by a connector of an accessory. In Example 14, the connector of the accessory is configured to engage the first accessory mounting segment to removably couple the accessory to the first accessory rail.

Example 15 includes the portable stand of Example 14. In Example 15, a shape of a portion of the connector of the accessory complements a shape of a portion of the first accessory mounting segment of the first accessory rail.

Example 16 includes the portable stand of Example 14. In Example 16, the accessory is a tool hook, a caddy, a bottler holder, a roll holder, or a bag holder.

Example 17 includes the portable stand of Example 13. In Example 17, the portable stand further comprises a second accessory rail coupled to the second tabletop. In Example 17, the second accessory rail includes a second accessory mounting segment spaced apart from and extending along an outer lateral edge of a support web of the second tabletop.

Example 18 includes the portable stand of Example 17. In Example 18, the first accessory mounting segment is configured to be engaged by a connector of a first accessory, and the second accessory mounting segment is configured to be engaged by a connector of a second accessory. In Example 18, the connector of the first accessory is configured to engage the first accessory mounting segment to removably couple the first accessory to the first accessory rail, and the connector of the second accessory is configured to engage the second accessory mounting segment to removably couple the second accessory to the second accessory rail.

Example 19 includes the portable stand of Example 18. In Example 19, a shape of a portion of the connector of the first accessory complements a shape of a portion of the first accessory mounting segment of the first accessory rail, and a shape of a portion of the connector of the second accessory complements a shape of a portion of the second accessory mounting segment of the second accessory rail. In Example 19, the shape of the portion of the second accessory mounting segment matches the shape of the portion of the first accessory mounting segment, and the shape of the portion of the connector of the second accessory matches the shape of the portion of the connector of the first accessory. In Example 19, the first and second accessories are respectively configured to be interchangeably removably coupled to either one of the first and second accessory rails.

Example 20 includes the portable stand of Example 19. In Example 20, the first and second accessories respectively include one or more of a tool hook, a caddy, a bottle holder, a roll holder, or a bag holder.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A portable stand for a portable grill, the portable stand comprising:

a frame including a front support, a rear support, a first support plate brace, a second support plate brace, and a support plate, the rear support spaced apart from the front support, the first support plate brace fixedly coupled to and extending between the front support and the rear support, the second support plate brace spaced apart from the first support plate brace, the second support plate brace fixedly coupled to and extending between the front support and the rear support, the support plate located between the front support and the rear support, the support plate having a first lateral portion fixedly coupled to and supported by the first support plate brace and a second lateral portion fixedly coupled to and supported by the second support plate brace; and first and second tabletops slidable relative to the frame between an expanded position and a retracted position, the first and second tabletops configured to reveal corresponding ones of the first and second lateral portions of the support plate when the first and second tabletops are in the expanded position, the first and second tabletops configured to conceal the corresponding ones of the first and second lateral portions of the support plate when the first and second tabletops are in the retracted position;

wherein the frame further includes:
 a first front slider assembly including a track fixedly coupled to the front support of the frame and a slider fixedly coupled to a front support of the first tabletop, the slider of the first front slider assembly being slidable relative to the track of the first front slider assembly;
 a second front slider assembly including a track fixedly coupled to the front support of the frame and a slider fixedly coupled to a front support of the second tabletop, the slider of the second front slider assembly being slidable relative to the track of the second front slider assembly;
 a first rear slider assembly including a track fixedly coupled to the rear support of the frame and a slider fixedly coupled to a rear support of the first tabletop, the slider of the first rear slider assembly being slidable relative to the track of the first rear slider assembly; and
 a second rear slider assembly including a track fixedly coupled to the rear support of the frame and a slider fixedly coupled to a rear support of the second tabletop, the slider of the second rear slider assembly being slidable relative to the track of the second rear slider assembly;
 wherein the first front slider assembly and the first rear slider assembly facilitate sliding the first tabletop relative to the frame between the expanded position and the retracted position, and the second front slider assembly and the second rear slider assembly facilitate sliding the second tabletop relative to the frame between the expanded position and the retracted position.

2. The portable stand of claim 1, wherein the first and second tabletops are configured to provide corresponding first and second side tables relative to the portable grill when the first and second tabletops are in the expanded position and the portable grill is seated on the support plate.

3. The portable stand of claim 1, wherein the first and second tabletops are configured to provide a substantially continuous and unobstructed tabletop when the first and second tabletops are in the retracted position.

4. The portable stand of claim 1, wherein the second tabletop is spaced apart from the first tabletop by a retracted lateral distance of one inch or less when the first and second tabletops are in the retracted position, and wherein the second tabletop is spaced apart from the first tabletop by an expanded lateral distance of twelve inches or more when the first and second tabletops are in the expanded position.

5. The portable stand of claim 1, wherein the first and second lateral portions of the support plate form a continuous planar surface.

6. The portable stand of claim 1, wherein an upper surface of the support plate is located below an upper surface of the first tabletop and below an upper surface of the second tabletop.

7. The portable stand of claim 1, further comprising a latch assembly configured to selectively couple the first tabletop to the second tabletop when the first and second tabletops are in the retracted position, the latch assembly including a latch plate pivotally coupled to a front support of one of the first and second tabletops and a latch post fixedly coupled to the other one of the first and second tabletops, the latch plate including a notch configured to selectively receive the latch post in response to rotation of the latch plate relative to the latch post when the first and second tabletops are in the retracted position.

8. The portable stand of claim 1, further comprising first and second leg units extending between and pivotally coupled to the front and rear supports of the frame, wherein the first and second leg units are moveable relative to the frame between an erected position and a collapsed position.

9. The portable stand of claim 8, wherein the portable stand has a first height when the first and second leg units are in the erected position and a second height when the first and second leg units are in the collapsed position, wherein of the second height is less than the first height.

10. The portable stand of claim 8, wherein the first and second leg units each include one or more adjustable feet configured to level the frame, wherein each adjustable foot includes a threaded shaft configured to engage a complementary threaded bore of a leg of the first and second leg units, wherein rotational movement of the threaded shaft of the adjustable foot relative to the threaded bore of the leg causes translational movement of the adjustable foot relative to the leg between a retracted foot position and an extended foot position.

11. The portable stand of claim 8, wherein the portable stand is configured to be transitioned between a first configuration, a second configuration, and a third configuration, wherein the first and second leg units are in the erected position and the first and second tabletops are in the expanded position when the portable stand is positioned in the first configuration, wherein the first and second leg units are in the erected position and the first and second tabletops are in the retracted position when the portable stand is positioned in the second configuration, and wherein the first and second leg units are in the collapsed position and the first and second tabletops are in the retracted position when the portable stand is in the third configuration.

12. The portable stand of claim 1, wherein the front support and the rear support of the frame each include a linear segment, a first leg brace integrally formed with the linear segment and extending downwardly from a first end of the linear segment, and a second leg brace integrally formed with the linear segment and extending downwardly from a second end of the linear segment located opposite the first end of the linear segment, wherein the portable stand further comprises a first leg unit extending between and pivotally coupled to the first leg braces of the front and rear supports of the frame and a second leg unit extending between and pivotally coupled to the second leg braces of the front and rear supports of the frame, wherein the first and second leg units are moveable relative to the frame between an erected position and a collapsed position.

13. A portable stand for a portable grill, the portable stand comprising:
a frame including a front support, a rear support spaced apart from the front support of the frame, and a support plate located between the front and rear supports of the frame, the support plate having a first lateral portion and a second lateral portion; and
first and second tabletops slidable relative to the frame between an expanded position and a retracted position, the first and second tabletops configured to reveal corresponding ones of the first and second lateral portions of the support plate when the first and second tabletops are in the expanded position, the first and second tabletops configured to conceal the corresponding ones of the first and second lateral portions of the support plate when the first and second tabletops are in the retracted position, wherein the first tabletop includes a front support, a rear support spaced apart from the front support of the first tabletop, a support web coupled to and extending between the front and rear supports of the first tabletop, and an accessory rail coupled to and extending between the front and rear supports of the first tabletop, the accessory rail of the first tabletop including an accessory mounting segment spaced apart from and extending along an outer lateral edge of the support web of the first tabletop, the accessory mounting segment of the accessory rail of the first tabletop including a contoured outer surface, a recessed inner surface, an upper engagement surface located between the contoured outer surface and the recessed inner surface, and a lower engagement surface located between the contoured outer surface and the recessed inner surface.

14. The portable stand of claim 13, wherein the accessory mounting segment of the accessory rail of the first tabletop is configured to be engaged by a connector of an accessory, wherein the connector of the accessory includes an upper engagement tab configured to engage the upper engagement surface of the accessory mounting segment of the accessory rail of the first tabletop and a lower engagement tab configured to engage the lower engagement surface of the accessory mounting segment of the accessory rail of the first tabletop to removably couple the accessory to the accessory rail of the first tabletop.

15. The portable stand of claim 14, wherein a shape of a portion of the connector of the accessory complements a shape of a portion of the accessory mounting segment of the accessory rail of the first tabletop.

16. The portable stand of claim 14, wherein the accessory is a tool hook, a caddy, a bottle holder, a roll holder, or a bag holder.

17. The portable stand of claim 13, wherein the second tabletop includes a front support, a rear support spaced apart from the front support of the second tabletop, a support web coupled to and extending between the front and rear supports of the second tabletop, and an accessory rail coupled to and extending between the front and rear supports of the second tabletop, the accessory rail of the second tabletop including an accessory mounting segment spaced apart from and extending along an outer lateral edge of the support web of the second tabletop, the accessory mounting segment of the accessory rail of the second tabletop including a contoured outer surface, a recessed inner surface, an upper engagement surface located between the contoured outer surface and the recessed inner surface, and a lower engagement surface located between the contoured outer surface and the recessed inner surface.

18. The portable stand of claim 17, wherein the accessory mounting segment of the accessory rail of the first tabletop is configured to be engaged by a connector of a first accessory, and the accessory mounting segment of the accessory rail of the second tabletop is configured to be engaged by a connector of a second accessory, wherein the connector of the first accessory includes an upper engagement tab configured to engage the upper engagement surface of the accessory mounting segment of the accessory rail of the first tabletop and a lower engagement tab configured to engage the lower engagement surface of the accessory mounting segment of the accessory rail of the first tabletop to removably couple the first accessory to the accessory rail of the first tabletop, and the connector of the second accessory includes an upper engagement tab configured to engage the upper engagement surface of the accessory mounting segment of the accessory rail of the second tabletop and a lower engagement tab configured to engage the lower engagement surface of the accessory mounting segment of the accessory rail of the second tabletop to removably couple the second accessory to the accessory rail of the second tabletop.

19. The portable stand of claim 18, wherein a shape of a portion of the connector of the first accessory complements a shape of a portion of the accessory mounting segment of the accessory rail of the first tabletop, and a shape of a portion of the connector of the second accessory complements a shape of a portion of the accessory mounting segment of the accessory rail of the second tabletop, wherein the shape of the portion of the accessory mounting segment of the accessory rail of the first tabletop matches the shape of the portion of the accessory mounting segment of the accessory rail of the second tabletop, and the shape of the portion of the connector of the second accessory matches the shape of the portion of the connector of the first accessory, wherein the first and second accessories are respectively configured to be interchangeably removably coupled to either one of the accessory rail of the first tabletop and the accessory rail of the second tabletop.

20. The portable stand of claim 19, wherein the first and second accessories respectively include one or more of a tool hook, a caddy, a bottle holder, a roll holder, or a bag holder.

21. The portable stand of claim 13, wherein the accessory rail of the first tabletop is integrally formed with the front and rear supports of the first tabletop.

\* \* \* \* \*